(12) United States Patent
Nomura et al.

(10) Patent No.: US 9,939,654 B2
(45) Date of Patent: Apr. 10, 2018

(54) IMAGING APPARATUS WITH ANTI-SHAKE MECHANISM

(71) Applicant: HOYA CORPORATION, Tokyo (JP)

(72) Inventors: Hiroshi Nomura, Saitama (JP); Takahiro Morinaga, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 105 days.

(21) Appl. No.: 14/885,250

(22) Filed: Oct. 16, 2015

(65) Prior Publication Data
US 2016/0116758 A1    Apr. 28, 2016

(30) Foreign Application Priority Data

Oct. 27, 2014    (JP) ................................ 2014-218164

(51) Int. Cl.
*G02B 27/64*    (2006.01)
*G02B 13/00*    (2006.01)
(Continued)

(52) U.S. Cl.
CPC ........... *G02B 27/646* (2013.01); *G02B 7/023* (2013.01); *G02B 13/0065* (2013.01); *H04N 5/23258* (2013.01); *H04N 5/23287* (2013.01)

(58) Field of Classification Search
CPC .... G02B 27/646; G02B 7/023; G02B 21/361; G02B 21/362; G02B 13/0065;
(Continued)

(56) References Cited

U.S. PATENT DOCUMENTS 7,465,107 B2 * 12/2008 Washisu ............... G02B 7/1805
348/E5.03
8,837,929 B2    9/2014 Nomura et al.
(Continued)

FOREIGN PATENT DOCUMENTS

| JP | 2008-134329 | 6/2008 |
| JP | 5096496 | 12/2012 |
| JP | 2014-089325 | 5/2014 |

OTHER PUBLICATIONS

U.S. Appl. No. 14/607,558 to Hiroshi Nomura et al., filed Jan. 28, 2015.
(Continued)

*Primary Examiner* — Mustak Choudhury
(74) *Attorney, Agent, or Firm* — Greenblum & Bernstein, P.L.C.

(57) ABSTRACT

An imaging apparatus includes a front lens group, including a reflector element and a front lens element on the object side thereof, and a rear lens group; a support member, fixed to a fixed member that supports the reflector element, including a spherical-swinging operation support positioned behind the reflection surface of the reflector element and supporting a movable member supporting the front lens element to spherically swing about a predetermined point, a rotation preventer preventing the movable member from rotating about the optical axis of the front lens element, a detector supporter, and a mounting portion mounted to the fixed member; an actuator which drives the movable member to spherically swing the movable member in response to vibrations applied to the imaging optical system; a detector detecting positional variations of the movable member; and an adjuster which adjusts the position of the mounting portion relative to the fixed member.

20 Claims, 25 Drawing Sheets

(51) Int. Cl.
*G02B 7/02* (2006.01)
*H04N 5/232* (2006.01)

(58) Field of Classification Search
CPC ............... G02B 7/1805; G02B 7/1822; H04N 5/23287; H04N 5/23258; H04N 5/2259; H04N 5/232
USPC ..... 359/217.3, 226.2, 470, 554–557; 396/55, 396/351, 421, 428, 439
See application file for complete search history.

(56) References Cited

U.S. PATENT DOCUMENTS

| | | |
|---|---|---|
| 9,020,334 B1 | 4/2015 | Suzuka |
| 9,025,945 B2 | 5/2015 | Nomura et al. |
| 9,063,346 B2 | 6/2015 | Suzuka |
| 9,063,347 B2 | 6/2015 | Suzuka |
| 2010/0202766 A1* | 8/2010 | Takizawa ................ G03B 5/00 396/55 |
| 2014/0119717 A1 | 5/2014 | Yasuda |

OTHER PUBLICATIONS

U.S. Appl. No. 14/607,689 to Hiroshi Nomura et al., filed Jan. 28, 2015.
U.S. Appl. No. 14/607,628 to Hiroshi Nomura et al., filed Jan. 28, 2015.
U.S. Appl. No. 14/828,883 to Mutsumi Koguchi, filed Aug. 18, 2015.

* cited by examiner

IMAGING APPARATUS WITH ANTI-SHAKE MECHANISM

BACKGROUND OF THE INVENTION

1. Field of the Invention

The present invention relates to an imaging apparatus equipped with an anti-shake (image shake correction/image stabilizing/shake reduction) system.

2. Description of the Related Art

In recent years, mobile electronic devices which are designed mainly for taking still/moving photographic images, such as digital cameras (still-video cameras) and digital camcorders (motion-video cameras), and other mobile electronic devices which are designed to be capable of taking such photographic images as a subsidiary function, such as mobile phones equipped with a camera and smart devices (smart phones or tablet computers, etc.) equipped with a camera, have become widespread. There has been a demand for an imaging apparatus which is incorporated in such mobile electronic devices to be equipped with a so-called anti-shake (image shake correction/image stabilizing/shake reduction) system that is designed to reduce image shake on an image plane that is caused by vibrations such as hand shake.

As an anti-shake system, a type of anti-shake system which moves (shifts) an anti-shake (image-stabilizing) optical element such as a lens group (containing at least one lens element) or an image sensor along a plane orthogonal to an optical axis and another type of anti-shake system which changes the angle of (tilts) such an anti-shake optical element relative to an optical axis are known in the art. In addition, another type of anti-shake system which drives an anti-shake optical element to spherically swing along an imaginary spherical plane having a predetermined spherical-swinging center with no directional restrictions (hereinafter referred to as the spherical swinging operation) has been proposed in Japanese Unexamined Patent Publication No. 2014-89325 (Patent Literature 1), Japanese Unexamined Patent Publication No. 2008-134329 (Patent Literature 2) and Japanese Patent No. 5,096,496 (Patent Literature 3).

In the type of anti-shake system which performs a spherical swinging operation, the spherical-swinging center of the spherical swinging operation is often set at a point on an optical axis of an optical system (or on an extension of this optical axis). However, if the support mechanism for the anti-shake system is simply arranged on this optical axis, this mechanism may interfere with an optical path of the optical system, so that it is required to take the arrangement of the support mechanism into consideration so that the support mechanism does not interfere with the optical path.

In Patent Literature 1, a correction lens group (image-stabilizing lens group) is supported by an image-shake correction unit, which provided as a movable member, and this image-shake correction unit is supported to be capable of performing a spherical swinging operation via a plurality of rollers (rolling members) installed between a portion of the image-shake correction unit which is positioned around the correction lens group and a fixed member. Accordingly, instead of arranging the support mechanism at the location of the spherical-swinging center, the spherical-swinging center is virtually set by the support mechanism that is arranged around the correction lens group. In Patent Literature 2, a correction lens group (image-stabilizing lens group) is supported to be capable of performing a spherical swinging operation via a similar structure. In the structures disclosed in Patent Literatures 1 and 2, the installation space for the support mechanism tends to be large in a direction orthogonal to an optical axis.

In Patent Literature 3, an entire camera section, which includes an optical system and an image sensor, is driven to perform a spherical swinging operation, and this camera section is supported to be capable of performing the spherical swinging operation with a protrusion as a point of support which is formed on a fixed portion. In Patent Literature 3, a substantive spherical-swinging center is set on an extension of an optical axis, and therefore it is difficult to apply the structure disclosed in Patent Literature 3 to the type of anti-shake system in which only apart of a plurality of optical elements constituting an optical system is driven to perform an anti-shake (image-stabilizing) operation. Additionally, according to the structure disclosed in Patent Literature 3, an increase in size of the anti-shake system cannot be avoided because the entire camera section is driven to perform the spherical swinging operation.

Additionally, in each of Patent Literatures 1, 2 and 3, a sensor for detecting the position of a movable member is provided on a fixed member which supports the movable member in a manner to allow the movable member to perform a spherical swinging operation. Therefore, when an adjustment is made to the position of the movable member (e.g., to the position of the spherical-swinging center), a relative positional deviation occurs between the sensor, which is provided at a fixed position, and the movable member, the position of which is to be detected by the sensor, which may exert an influence on the detection accuracy of the sensor. Even if the relative positional deviation falls within a controllable level, it is required to correct the influence caused by the positional deviation in some sort of way to detect the position of the movable member and control the driving of the movable member, which increases processing load.

SUMMARY OF THE INVENTION

The present invention has been devised in view of the above described problems, and the present invention provides an imaging apparatus equipped with an anti-shake system which performs a spherical swinging operation, in which an optical element is driven to spherically swing, to correct image shake, and which is reduced in size and exhibits improved support accuracy for an anti-shake optical element and improved drive control performance.

According to an aspect of the present invention, an imaging apparatus is provided, including a front lens group which constitutes part of an imaging optical system of the imaging apparatus and includes a reflector element and at least one front lens element, which is positioned on the object side of the reflector element, wherein the reflector element includes a reflection surface which reflects light rays, incident from the object side, in a different direction; a rear lens group which constitutes another part of the imaging optical system and is positioned on the image side of the front lens group; a movable member which supports the front lens element; a fixed member which supports at least the reflector element; a support member which is fixed to the fixed member and supports the movable member to allow the movable member to spherically swing about a predetermined point, positioned behind the reflection surface with respect to a direction along an optical axis of the front lens element; an actuator which applies a driving force to the movable member to spherically swing the movable member about the predetermined point in response to vibrations applied to the imaging optical system; and a detector which detects positional variations of the movable member when the movable member spherically swings about the predetermined point. The support member includes a spherical-swinging operation support which is positioned behind the reflection surface in the direction along the optical axis of the front lens element and supports a supported portion of the movable member to allow the movable member to spherically swing about the predetermined point; a rotation preventer which prevents the movable member from rotating about the optical axis of the front lens element; a detector supporter which supports the detector; and a mounting portion which is mounted to the fixed member. The imaging apparatus further includes an adjuster which enables the mounting portion to be positionally adjusted relative to the fixed member.

It is desirable for the adjuster to allow the mounting portion to move relative to the fixed member along a plane that is orthogonal to the optical axis of the front lens element while preventing the mounting portion from moving toward the object side relative to the fixed member in the direction along the optical axis of the front lens element.

The adjuster can include an abutment portion which is formed on the fixed member, wherein the mounting portion abuts against the abutment portion from an opposite side of the abutment portion to the object side in the direction along the optical axis of the front lens element; a protrusion which protrudes from the abutment portion toward the opposite side from the object side; and a hole which is formed in the mounting portion of the support member and in which the protrusion is loosely engaged. The adjuster enables a position of the mounting portion to be adjusted relative to the fixed member, in a direction along the plane that is orthogonal to the optical axis of the front lens element, within a range defined by an adjusting clearance between an inner edge of the hole and an outer periphery of the protrusion.

It is desirable for the abutment portion of the fixed member to include a screw hole which is open toward the side opposite from the object side in the direction along the optical axis of the front lens element. The imaging apparatus is provided with a screw including a shaft portion which is inserted into the hole of the mounting portion to be screw-engaged in the screw hole of the fixed member, and a head fixed to the shaft portion. Screwing the shaft portion in the screw hole causes the mounting portion to be sandwiched between the head and the abutment portion.

It is desirable for the mounting portion to include a projection which is resiliently deformable and formed on a surface of the mounting portion which faces the head of the screw, and wherein screwing the shaft portion in the screw hole causes the head to press and resiliently deform the projection to thereby create a biasing force which presses the mounting portion against the abutment portion.

It is desirable for a minimum clearance between the abutment portion and the head in the direction along the optical axis of the front lens element to be defined by engagement between the protrusion of the abutment portion and the head of the screw. The mounting portion of the support member is movable along the plane that is orthogonal to the optical axis of the front lens element with the minimum clearance between the abutment portion and the head.

It is desirable for the adjuster to include a spacer which is inserted in between the abutment portion and the mounting portion to adjust a position of the support member relative to the fixed member in the direction along the optical axis of the front lens element.

It is desirable for the actuator to include a voice coil motor including a permanent magnet which is supported by the movable member, and a coil which is supported fixedly with respect to the fixed member. The detector includes a magnetic sensor which senses variations of magnetic field of the permanent magnet to obtain information on position of the movable member.

It is desirable for the spherical-swinging operation support of the support member to include a recess in which a concave spherical surface is formed, and for the supported portion of the movable member to include a convex spherical surface which is slidably engaged with the concave spherical surface.

It is desirable for the rotation preventer of the support member to include a rotation prevention projection which projects in a radial direction of an extension of the optical axis of the front lens element.

It is desirable for the reflector element to be one of a prism and a mirror.

It is desirable for the imaging apparatus to include a washer which is fitted on the shaft portion of the screw, and screwing the shaft portion in the screw hole to cause the mounting portion to be sandwiched between the washer and the abutment portion.

It is desirable for the projection to include a plurality of projections which are formed on the surface of the mounting portion at equi-angular intervals about the hole of the mounting portion.

According to the present invention, an imaging apparatus which is slim in the forward and rearward directions (when the object side is defined as the front side) and superior in image-stabilizing performance by making the front lens element, which is an optical element of a front lens group constituting a bending optical system and which is positioned in front of the reflector element, spherically swing to perform an image-stabilizing operation (the spherical swinging operation). The movable member is supported by the spherical-swinging operation support, which is positioned behind the reflection surface of the reflector element in a direction along the optical axis of the front lens element, to be capable of performing the spherical swinging operation, and the movable member is prevented from rotating by the rotation preventer that is provided on the support member. Using space at the rear of the reflection surface of the reflector element as the installation space for the spherical-swinging operation support makes it possible to achieve a support structure for the movable member which is superior in space utilization without interfering with any optical path. In addition, the movable member can be driven to perform the spherical swinging operation with high precision and high stability using a small, light-weight and simple actuator (s) by preventing the movable member from rotating by the rotation preventer of the support member. Additionally, by making the position of the support member adjustable relative to the fixed member while the detector, which detects variations in position of the movable member, is supported by the support member, no variation in the positional relationship occurs between the detector and the movable member when an adjustment is made to the position of the support member relative to the fixed member, thus making it possible to control the spherical swinging operation of the movable member with high precision. Additionally, when an adjustment is made to the position of the support member relative to the fixed member, the positional relationship between the spherical-swinging operation support and said rotation preventer does not vary either, which it makes it possible to support the movable member with high precision. With the above described features, an improvement in miniaturization of the anti-shake system in which the front lens element is driven to spherically swing to correct image shake, the support accuracy for the front lens element, and the drive control performance for the front lens element is achieved.

The present disclosure relates to subject matter contained in Japanese Patent Application No. 2014-218164 (filed on Oct. 27, 2014) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
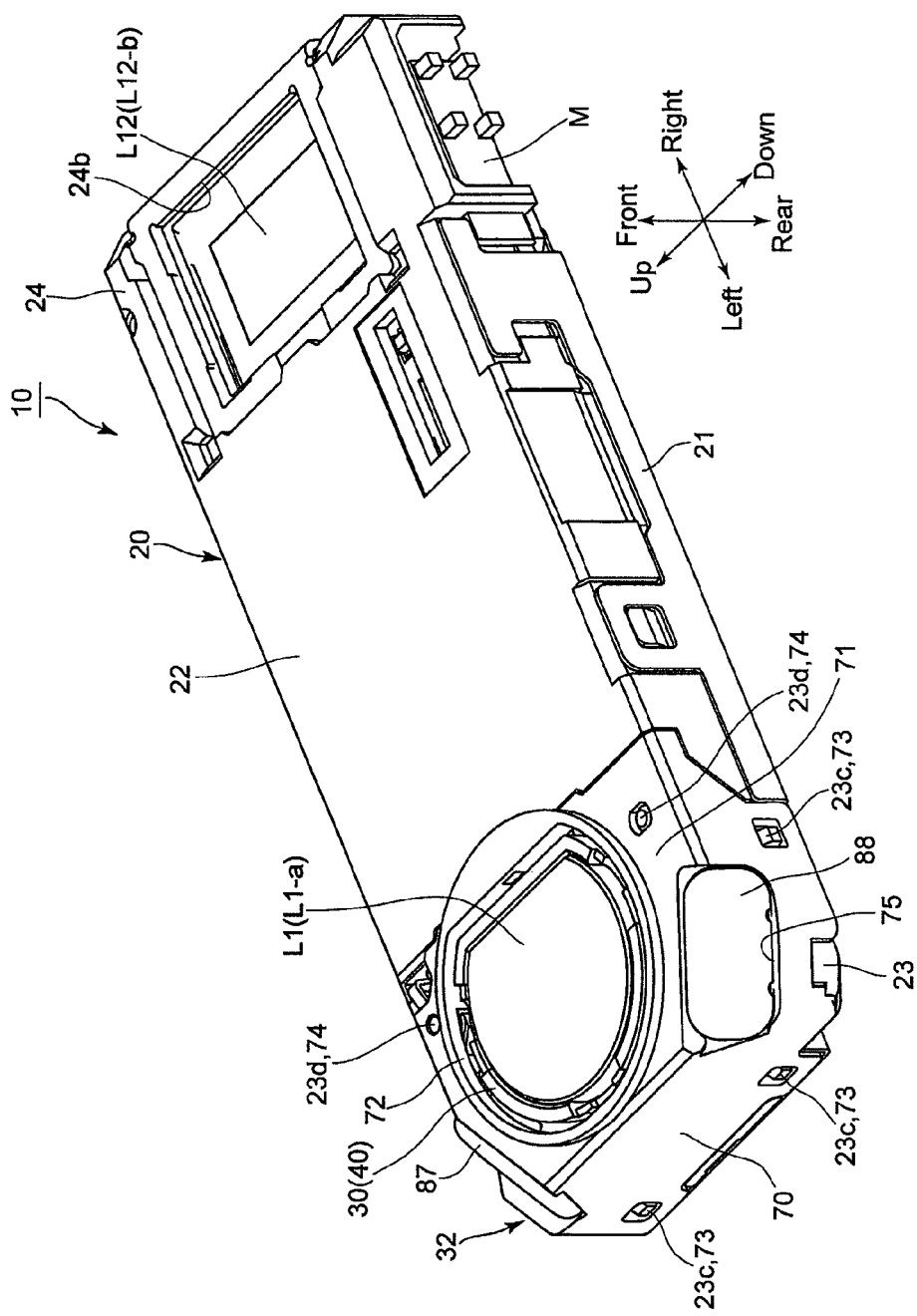
FIG. 1 is a front perspective view of an embodiment of an imaging unit (imaging apparatus) according to the present invention, showing the outward appearance of the imaging unit.
Figure 2:
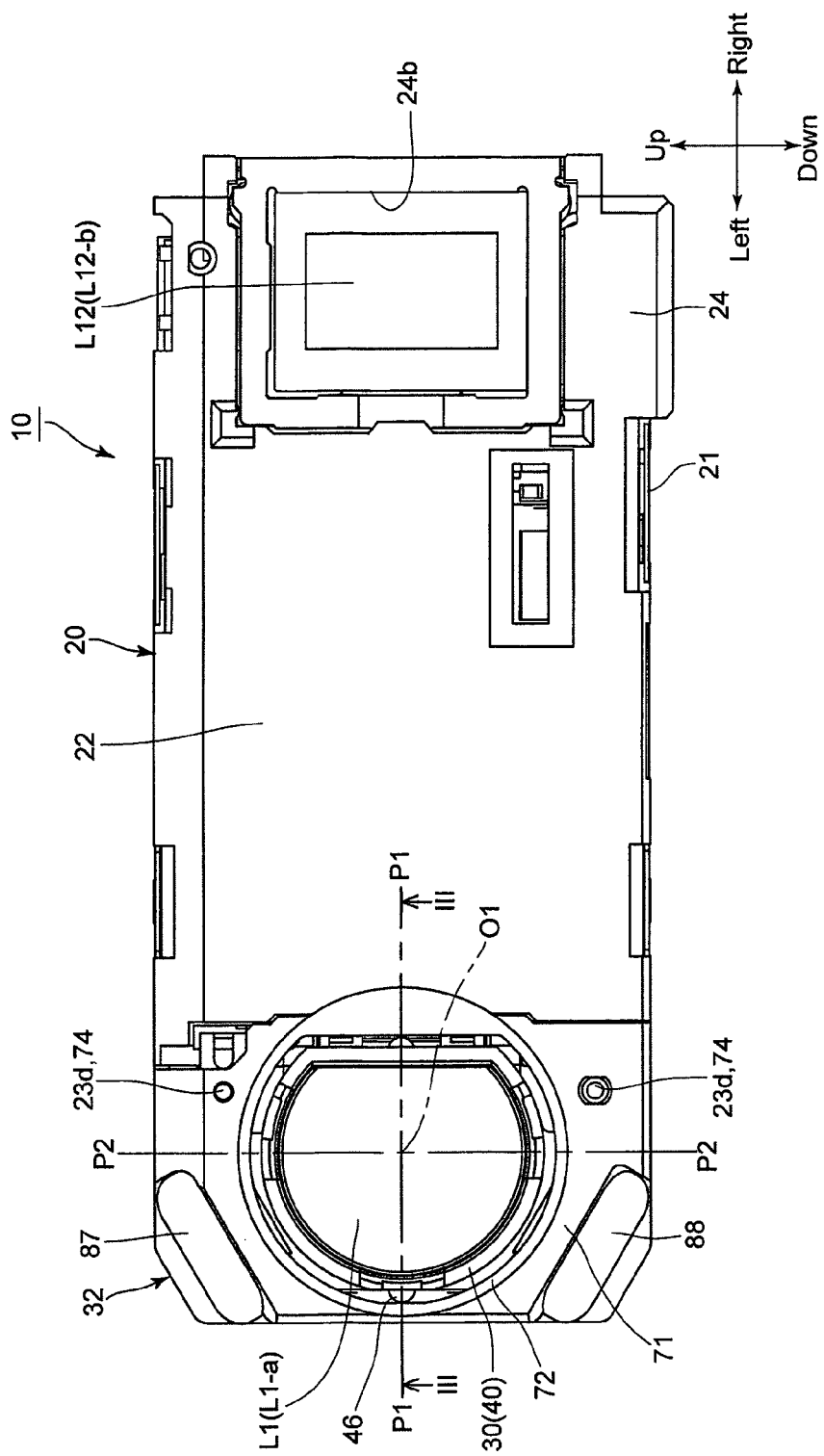
FIG. 2 is a plan view of the imaging unit, viewed from the object side.

An embodiment of an imaging unit (imaging apparatus) 10 according to the present invention will be discussed below with reference to FIGS. 1 through 32. In the following descriptions, forward and rearward directions, leftward and rightward directions, and upward and downward directions are determined with reference to the directions of the double-headed arrows shown in the drawings. The object side corresponds to the front side. As shown by the outward appearance of the imaging unit 10 in FIGS. 1 and 2, the imaging unit 10 has a laterally elongated shape which is slim in the forward and rearward directions and elongated in the leftward and rightward directions.

Figure 3:
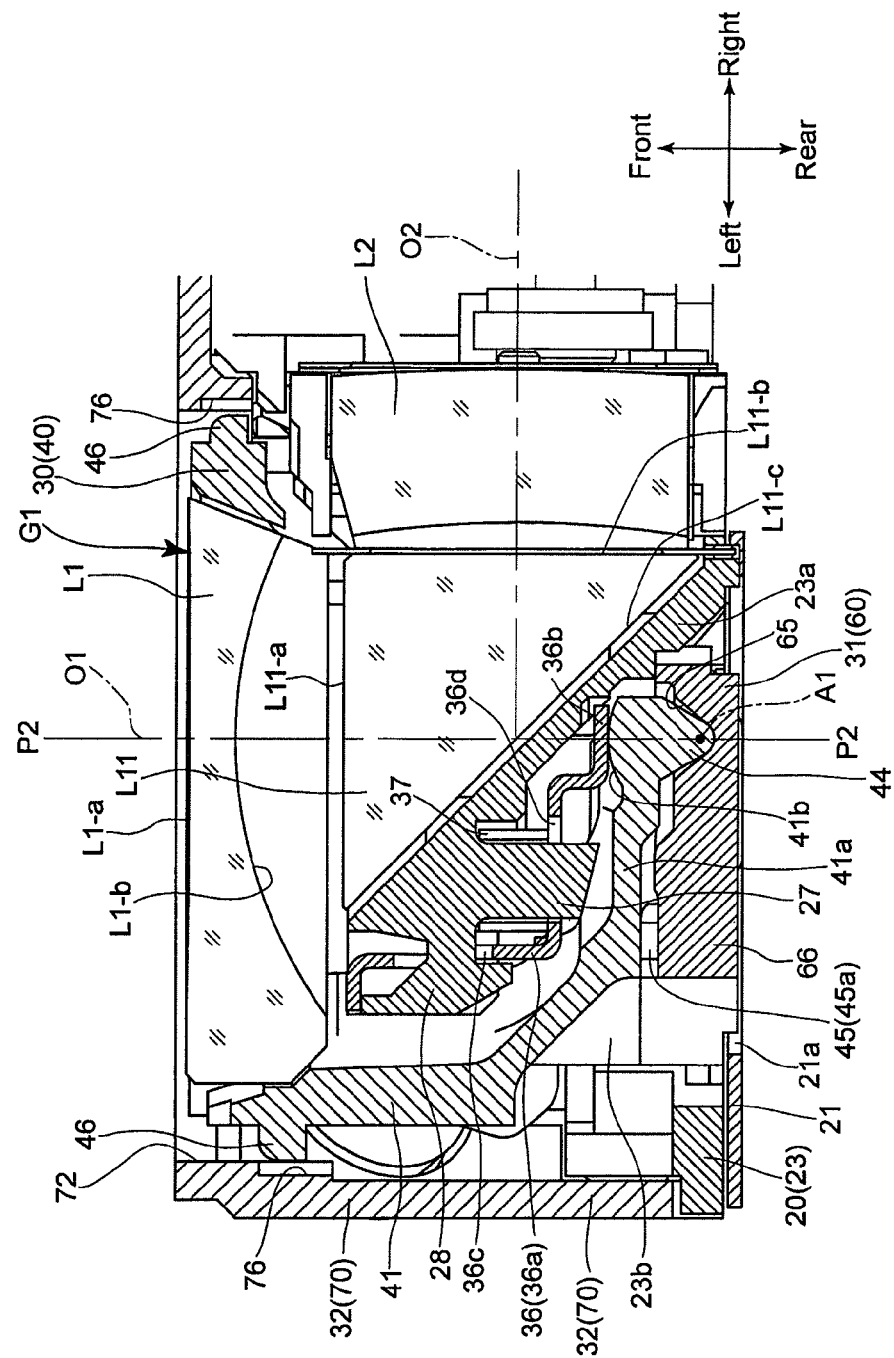
FIG. 3 is a sectional view taken along the line III-III shown in FIG. 2.
Figure 32:
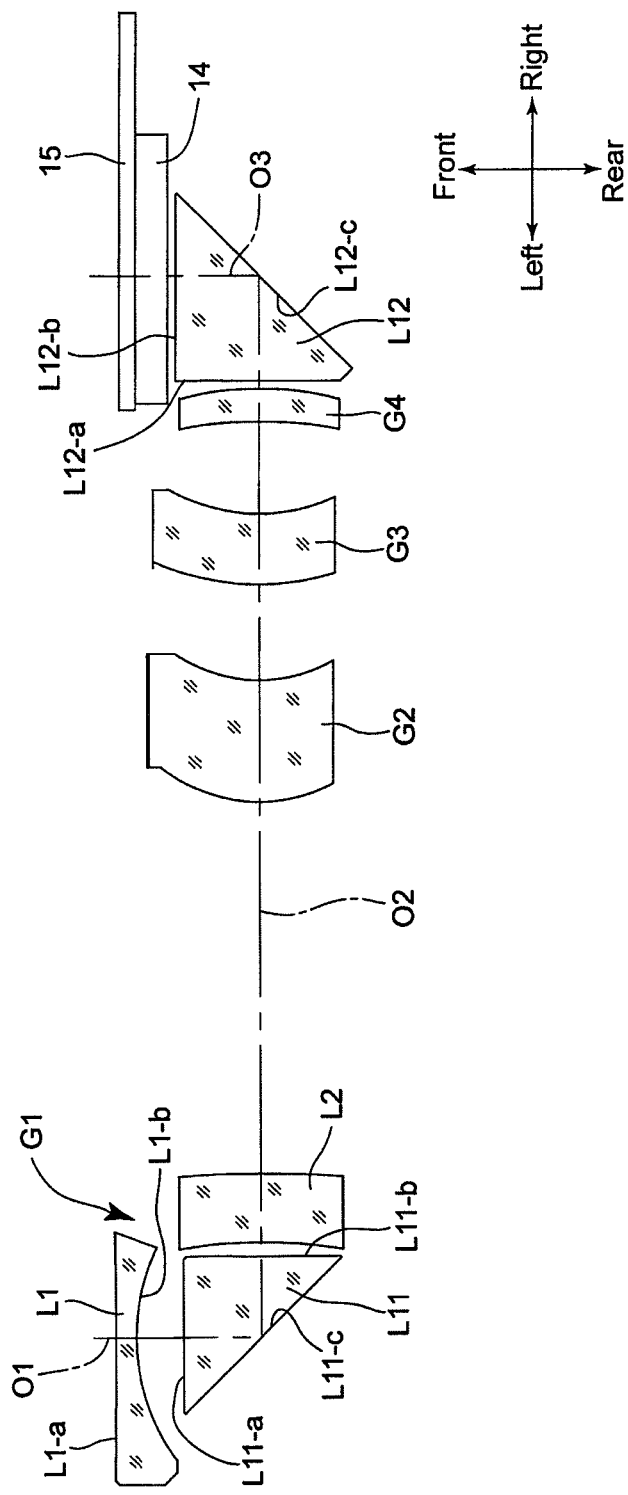
FIG. 32 is a sectional view of an imaging optical system provided in the imaging unit, taken along a plane on which the first optical axis, the second optical axis and the third optical axis of the imaging unit lie.

The imaging unit 10 is provided with an imaging optical system shown in FIG. 32. As shown in FIG. 32, this imaging optical system is provided with a first lens group (front lens group) G1, a second lens group (rear lens group) G2, a third lens group (rear lens group) G3 and a fourth lens group (rear lens group) G4. The first lens group G1 is provided with a first prism (reflector element) L11, and the imaging unit 10 is further provided, on the right-hand side (image plane side) of the fourth lens group G4, with a second prism (second reflector element) L12. The imaging optical system of the imaging unit 10 is configured as a bending optical system which reflects (bends) light rays at substantially right angles at each of the first prism L11 and the second prism L12. As shown in FIGS. 3 and 32, the first lens group G1 is configured of a first lens element (at least one front lens element of the front lens group) L1, the first prism L11 and a second lens element L2. The first lens element L1 is positioned in front of (on the object side of) an incident surface L11-a of the first prism L11, while the second lens element L2 is positioned on the right-hand side (image plane side) of an exit surface L11-b of the first prism L11. The first lens element L1 is a single lens element which is disposed so that an incident surface L1-a thereof faces toward the object side and so that an exit surface L1-b thereof faces toward the incident surface L11-a of the first prism L11. Each of the second lens group G2, the third lens group G3 and the fourth lens group G4 is a lens group including no reflector element such as a prism.

As shown in FIG. 32, light rays emanated from the photographic object and incident on the first lens element L1 along a first optical axis O1 extending in the rearward direction from the front of the imaging unit 10 enter the first prism L11 through the incident surface L11-a and are reflected by a reflection surface L11-c of the first prism L11 in a direction along a second optical axis O2 (extending from left to right) to exit from the exit surface L11-b of the first prism L11. Subsequently, the light rays exiting from the exit surface L11-b pass through the second lens element L2 of the first lens group G1 and the second through fourth lens groups G2, G3 and G4, which lie on the second optical axis O2, and are incident on the second prism L12 through an incident surface L12-a thereof. Subsequently, the light rays which are passed through the incident surface L12-a are reflected by a reflection surface L12-c of the second prism L12 in a direction along a third optical axis O3 (extending forwardly) and are incident on the imaging surface of an image sensor (image pickup device) 14 to form an object image thereon. The first optical axis O1 and the third optical axis O3 are substantially parallel to each other and lie, together with the second optical axis O2, on a common plane. The imaging unit 10 has a shape elongated in a direction along the second optical axis O2, and the first lens group G1 is positioned in the vicinity of an end (the left end) of the imaging unit 10 in the lengthwise direction thereof.

An imaginary plane on which the first optical axis O1, the second optical axis O2 and the third optical axis O3 lie is represented by a reference plane (first reference plane) P1 (see FIGS. 9 through 11, 15 through 17, 20 through 22, 28 and 29). An imaginary plane which is orthogonal to the first reference plane P1 and on which the first optical axis O1 lies is represented by a reference plane (second reference plane) P2 (see FIGS. 2, 9, 11 through 13, 15, 17, 18, 20, 22, 23, 29 and 30).

The first lens element L1 is a planoconcave lens element. More specifically, the incident surface L1-a of the first lens element L1, which faces toward the object side, is formed as a flat surface, and the exit surface L1-b of the first lens element L1, which faces toward the first prism L11, is formed as a concave surface. In addition, the first lens element L1 has a D-cut shape that is formed (defined) with a portion of the outer edge (circular edge with its center on the first optical axis O1) of the first lens element L1 that is positioned on the side toward which the second optical axis O2 extends cut out, in a direction along the second reference plane P2 as viewed from the front of the imaging unit 10. The incident surface L11-a and the exit surface L11-b of the first prism L11 are substantially orthogonal to each other, and the reflection surface L11-c of the first prism L11 is positioned at an angle of substantially 45 degrees with respect to the incident surface L11-a and the exit surface L11-b. Similar to the first prism L11, the incident surface L12-a and the exit surface L12-b of the second prism L12 are substantially orthogonal to each other, and the reflection surface L12-c of the second prism L12 is positioned at an angle of substantially 45 degrees with respect to the incident surface L12-a and the exit surface L12-b.

Figure 4:
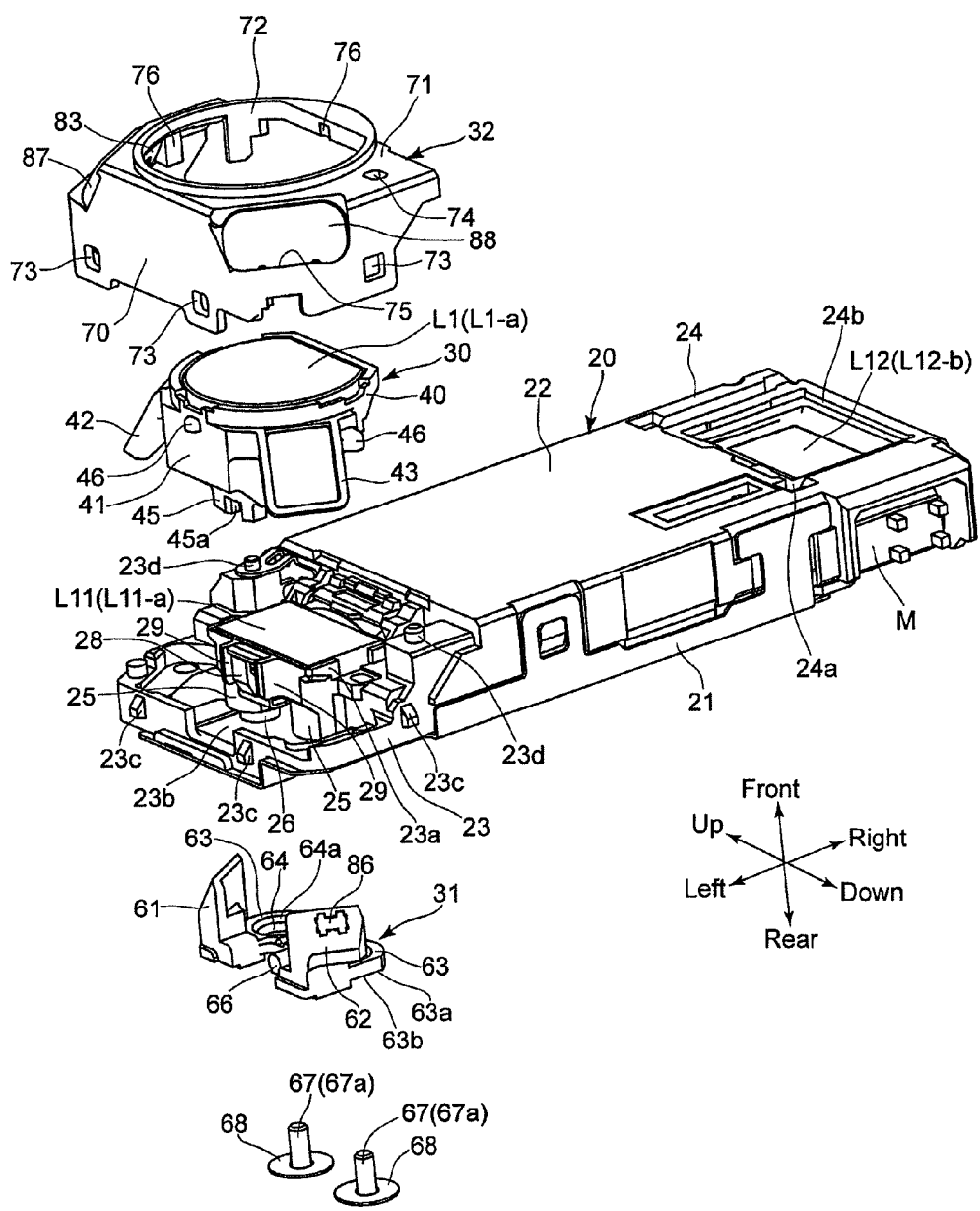
FIG. 4 is a front perspective view, partly exploded, of the imaging unit in a state where elements of the support and drive mechanism for the first lens element are detached.
Figure 5:
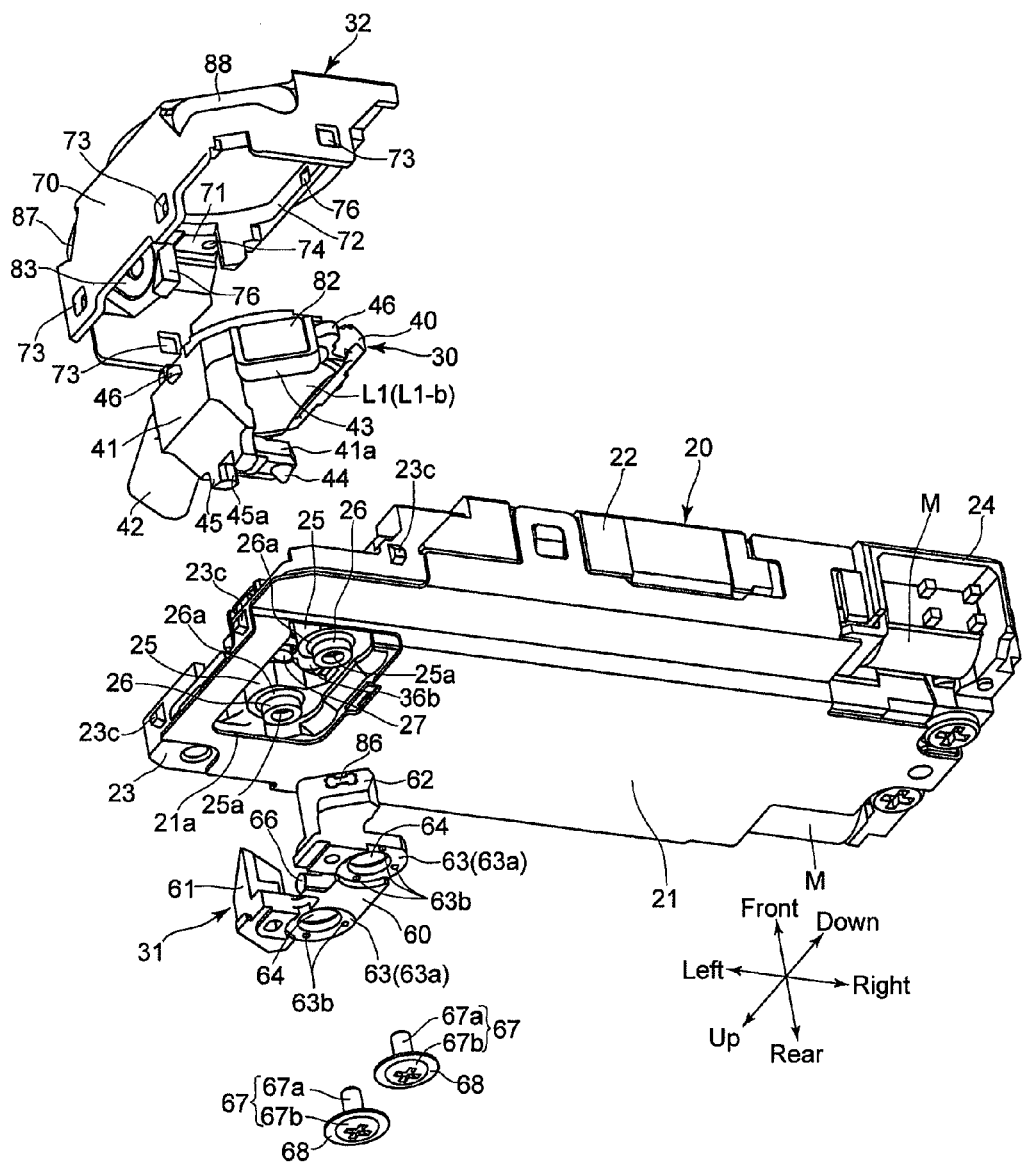
FIG. 5 is a rear perspective view, partly exploded, of the imaging unit in the same state as in FIG. 4.
Figure 6:
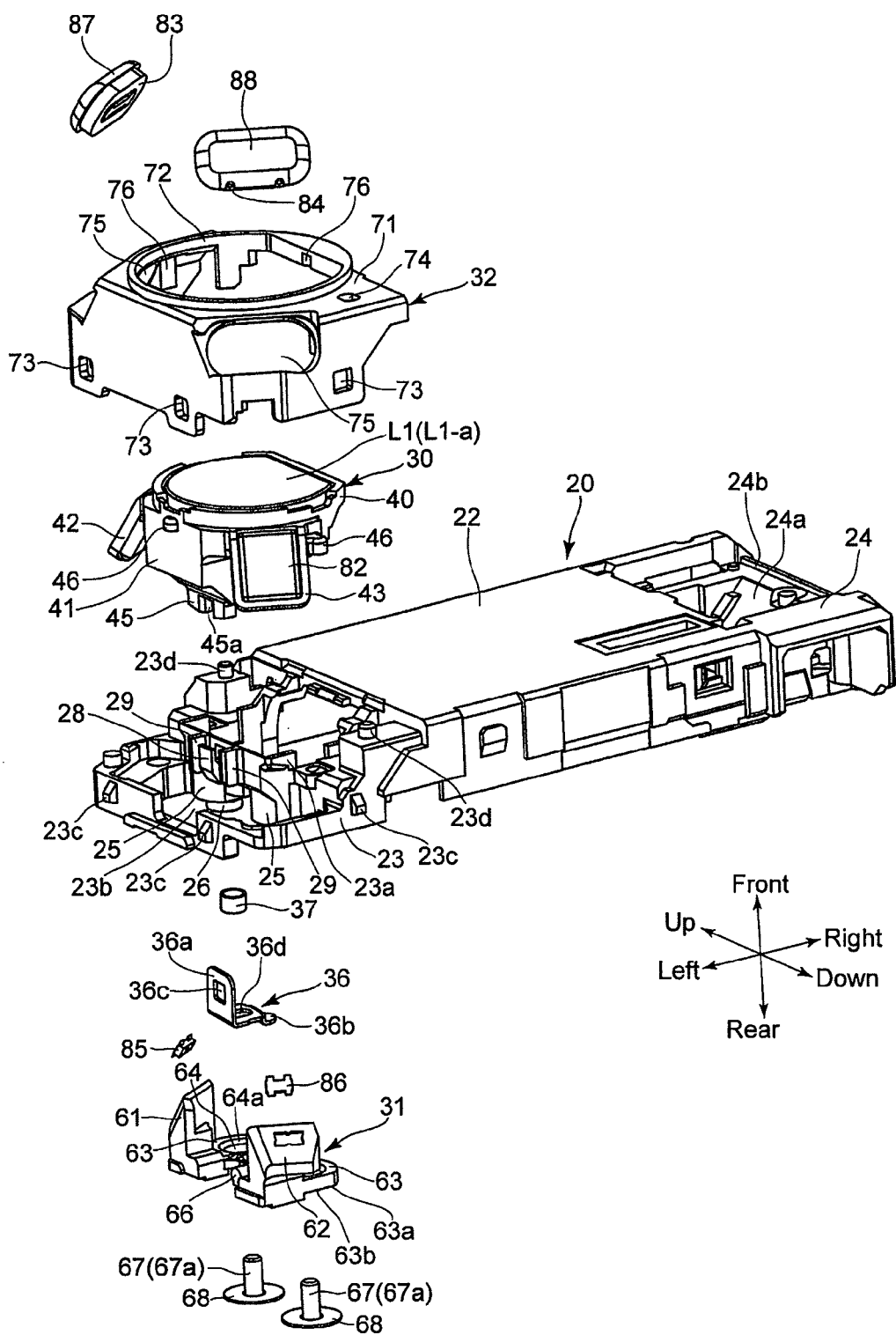
FIG. 6 is a front perspective view, partly exploded, of the imaging unit in a state where other elements of the support and drive mechanism for the first lens element are further detached from the state shown in FIGS. 4 and 5.

The imaging unit 10 is provided with a housing (fixed member) 20 and a rear support plate 21. As shown in FIGS. 4 through 6 and 24 through 29, the housing 20 is provided with a box-shaped portion 22, a first support portion 23 and a second support portion 24. The box-shaped portion 22 is open toward the rear of the imaging unit 10, the first support portion 23 is positioned on the left side of the box-shaped portion 22, and the second support portion 24 is positioned on the right side of the box-shaped portion 22. Although not shown in the drawings, a lens frame and another lens frame which hold the second lens group G2 and the third lens group G3, respectively, are positioned inside the box-shaped portion 22 and are supported thereby. As shown in FIGS. 4 and 6, the first support portion 23 and the second support portion 24 are provided with a prism holding frame 23a and a prism holding frame 24a which hold the first prism L11 and the second prism L12, respectively. The second lens element L2 of the first lens group G1 is fixedly supported by the first support portion 23, and the fourth lens group G4 is fixedly supported by the second support portion 24. The second support portion 24 is provided at the front thereof with a rectangular opening 24b, and an image sensor board 15 (see FIG. 32) which supports the image sensor 14 is fixed to the second support portion 24 to be positioned inside the rectangular opening 24b. As shown in FIGS. 4 and 5, the rear of the housing 20 is closed by the rear support plate 21. The rear support plate 21 is provided at a position immediately behind the first support portion 23 with an installation opening 21a (see FIG. 5).

The aforementioned lens frame (not shown) which holds the second lens group G2 and the aforementioned lens frame (not shown) which hold the third lens group G3 are supported inside the box-shaped portion 22 of the housing 20 to be movable linearly along the second optical axis O2, and these two lens frames are driven along the second optical axis O2 by the driving forces of two lens drive motors M (partly shown in FIGS. 1, 4 and 5), respectively, which are supported by the second support portion 24. The imaging optical system of the imaging unit 10 is a zoom lens system (variable-focal length lens system), and a zooming operation (power-varying operation) is performed by moving the second lens group G2 and the third lens group G3 along the second optical axis O2. In addition, a focusing operation is performed by moving the third lens group G3 along the second optical axis O2.

The imaging unit 10 is provided with an anti-shake (image shake correction/image stabilizing/shake reduction) system that reduces image shake on an image plane which is caused by vibrations such as hand shake. This anti-shake system causes the first lens element L1 of the first lens group G1 to spherically swing along an imaginary spherical plane about a spherical-swinging center A1 (see FIGS. 3 and 13), which is positioned on a straight line extended from the first optical axis O1 (i.e., on an extension of the first optical axis O1). This swinging operation of the first lens element L1 along the imaginary spherical plane about the spherical-swinging center A1 will be hereinafter referred to as the spherical swinging operation. The first optical axis O1 in the drawings of the present embodiment of the imaging apparatus denotes the position of the optical axis of the first lens element L1 in a state where the first lens element L1 is positioned at an initial optical-design position of the first lens element L1 when no image shake correction operation is performed (i.e., at the center of the driving range thereof in the spherical swinging operation by the anti-shake system). The position of the first lens element L1 in this state (reference state) will be hereinafter referred to as the image-stabilizing initial position.

The imaging unit 10 is provided in the vicinity of the left end thereof with a first lens frame (movable member) 30 and a sensor holder (support member) 31. The first lens element L1 is fixedly supported by the first lens frame 30, and the first lens frame 30 is supported by the sensor holder 31 to be capable of performing the spherical swinging operation relative to the sensor holder 31. The sensor holder 31 is fixedly supported by the first support portion 23 of the housing 20. A cover member 32 which is shaped to surround the first lens frame 30 is mounted onto the first support portion 23 of the housing 20.

The imaging unit 10 is provided with an electromagnetic actuator consisting of two voice coil motors (VCMs) for driving the first lens frame 30 (the first lens element L1). Specifically, the imaging unit 10 is provided with a pair of permanent magnets 81 and 82 (see FIGS. 7 through 10, 14 through 16, and 28) and a pair of coils 83 and 84 (FIGS. 6 and 15), and the permanent magnet 81 and the coil 83 constitute one of the two voice coil motors and the permanent magnet 82 and the coil 84 constitute the other voice coil motor. The pair of permanent magnets 81 and 82 are supported by the first lens frame 30, and the pair of coils 83 and 84 are supported by the cover member 32. The imaging unit 10 is further provided with a pair of Hall sensors (detectors/magnetic sensors) 85 and 86 (see FIGS. 6, 8, 10, 19 through 21, and 23) which are supported by the sensor holder 31. The position of the first lens frame 30 (the first lens element L1) that is driven by the electromagnetic actuator is detected using the pair of Hall sensors 85 and 86.

Figure 9:
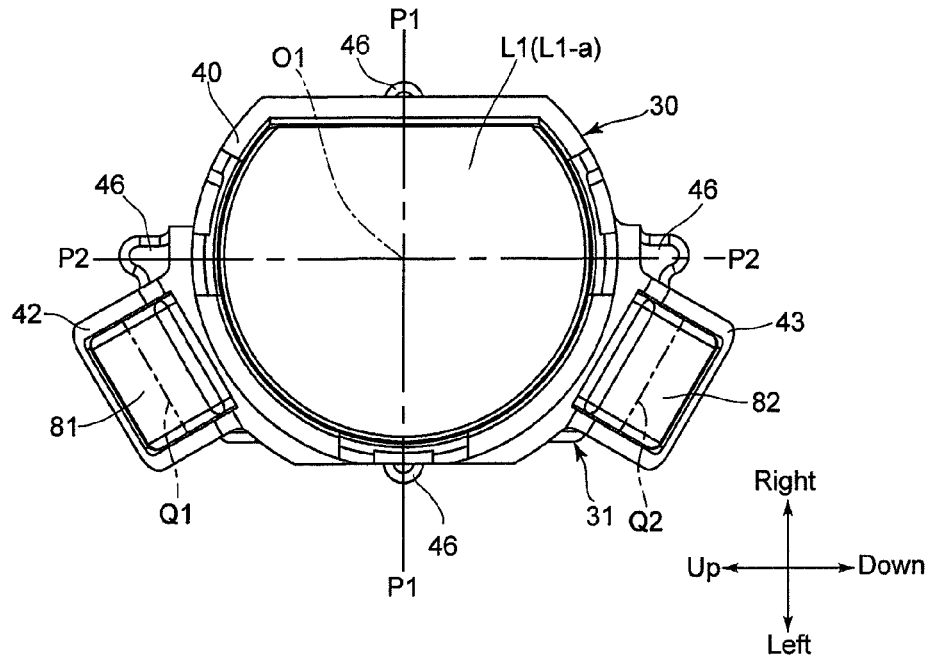
FIG. 9 is a front elevational view of the combination of the first lens frame and the sensor holder, viewed from the front of the imaging unit.
Figure 10:
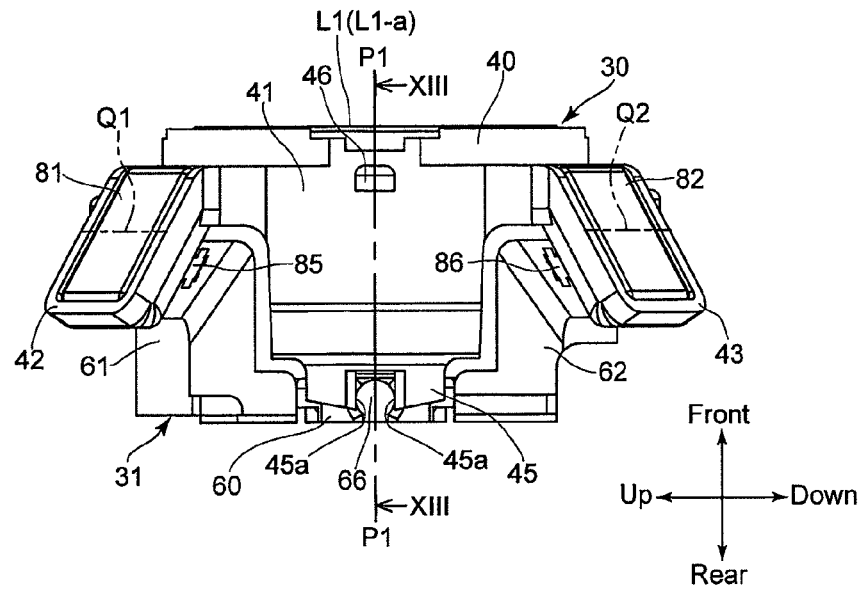
FIG. 10 is a side elevational view of the combination of the first lens frame and the sensor holder, viewed from the left side of the imaging unit.
Figure 11:
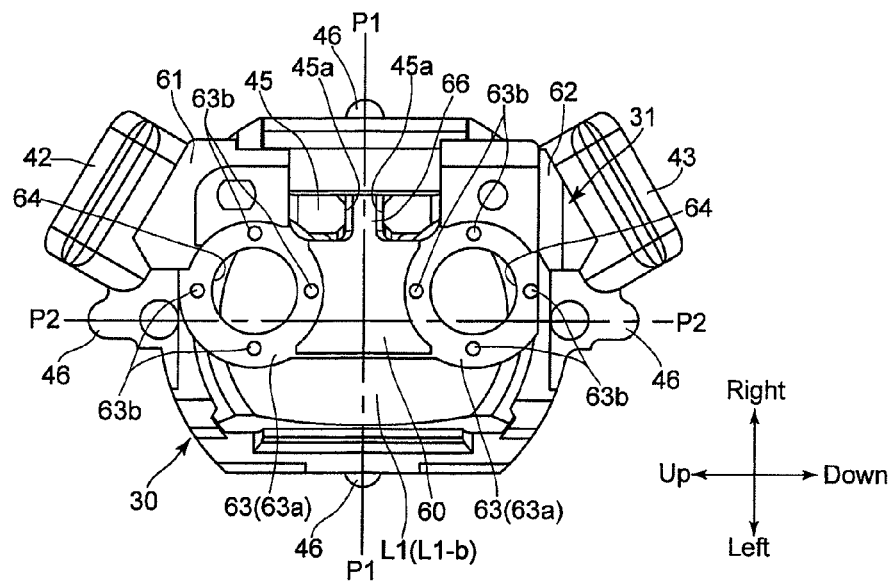
FIG. 11 is a rear elevational view of the combination of the first lens frame and the sensor holder, viewed from the rear of the imaging unit.
Figure 12:
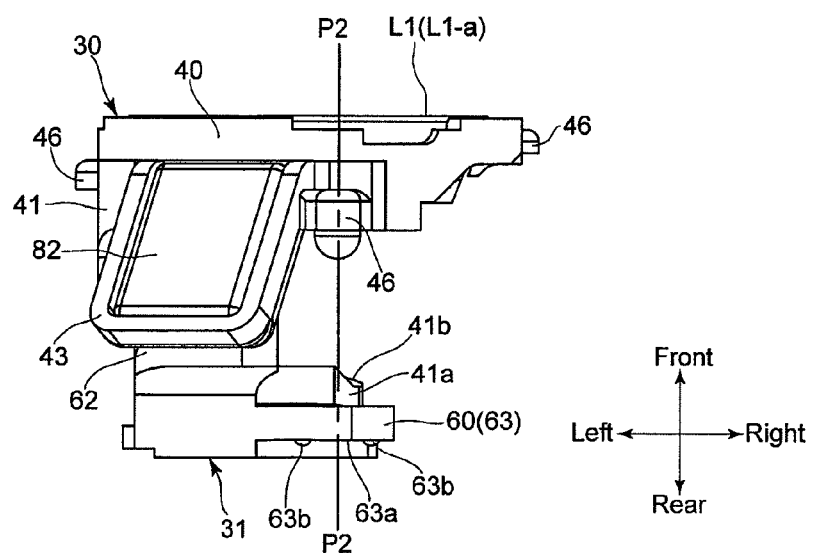
FIG. 12 is a view of the combination of the first lens frame and the sensor holder, viewed from the bottom of the imaging unit.

Each of the permanent magnets 81 and 82 is in the shape of a flat rectangular parallelepiped. The permanent magnets 81 and 82 are substantially identical in shape and size. The permanent magnets 81 and 82 have a magnetic pole boundary line Q1 and a magnetic pole boundary line Q2, respectively, as shown in FIGS. 9 and 10, and each of the permanent magnets 81 and 82 has the north and south poles thereof on the opposite sides of the associated magnetic pole boundary line Q1 or Q2. Although each of the magnetic pole boundary lines Q1 and Q2 is shown as a straight line in the drawings, the actual boundary between the north and south poles of each permanent magnet Q1 and Q2 is an imaginary plane which is formed continuously in the thickness direction of the permanent magnet.

Figure 15:
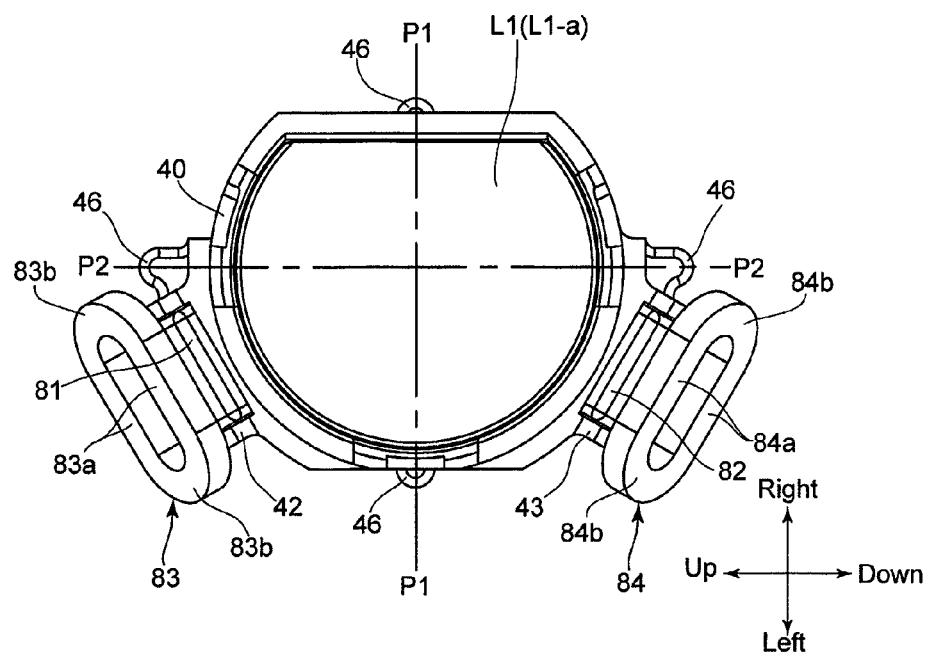
FIG. 15 is a front elevational view of the first lens frame, permanent magnets (supported by the first lens frame) and coils (supported by a cover member which is fixed to the housing of the imaging unit), viewed from the front of the imaging unit.
Figure 16:
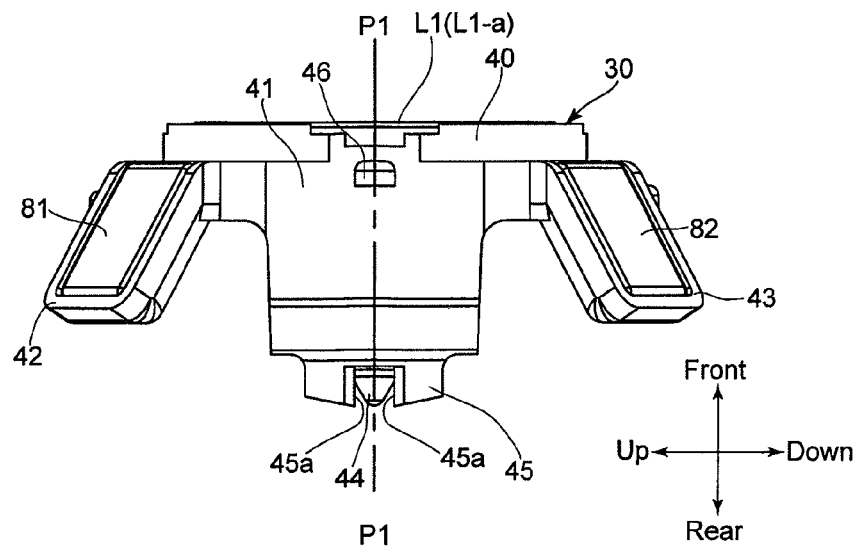
FIG. 16 is a side elevational view of the elements shown in FIG. 14 that include the first lens frame, viewed from the left side of the imaging unit.
Figure 17:
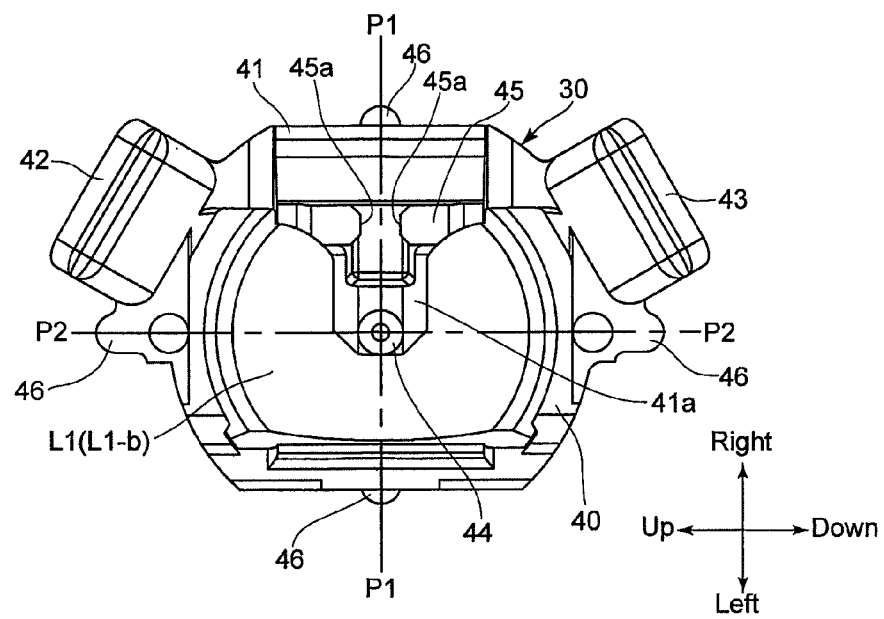
FIG. 17 is a rear elevational view of the elements shown in FIG. 14 that include the first lens frame, viewed from the rear of the imaging unit.

As shown in FIG. 15, the coil 83 is an elongated air-core coil which includes a pair of linear portions 83a that are substantially parallel to each other and a pair of curved (U-shaped) portions 83b which connect the pair of linear portions 83a at the respective ends thereof. Likewise, the coil 84 is an elongated air-core coil which includes a pair of linear portions 84a that are substantially parallel to each other and a pair of curved (U-shaped) portions 84b which connect the pair of linear portions 84a at the respective ends thereof. Each coil 83 and 84 is shaped into a thin and flat coil such that the thickness in the direction passing through the air-core portion is smaller than the width in the direction transverse to the pair of linear portions. The magnetic pole boundary line Q1 and the elongated direction of the linear portions 83a are substantially parallel to each other and the magnetic pole boundary line Q2 and the elongated direction of the linear portions 84a are substantially parallel to each other. The coils 83 and 84 are substantially identical in shape and size to each other. The coils 83 and 84 are supported by two coil support members 87 and 88 (see FIG. 6), respectively, which are fixedly mounted to the cover member 32.

Figure 13:
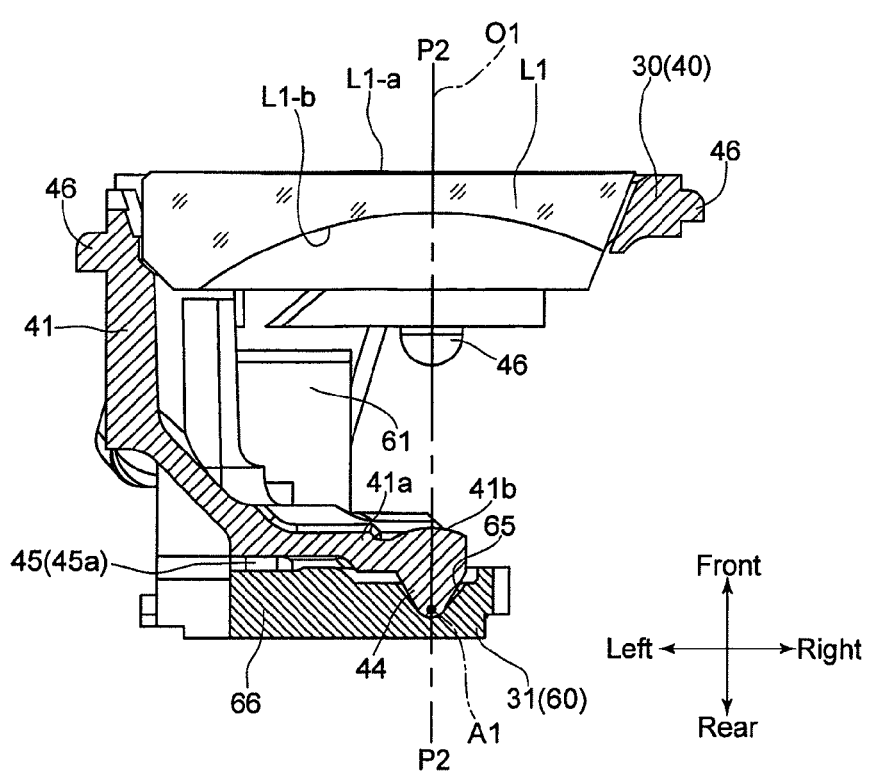
FIG. 13 is a sectional view taken along the line XIII-XIII shown in FIG. 10.
Figure 14:
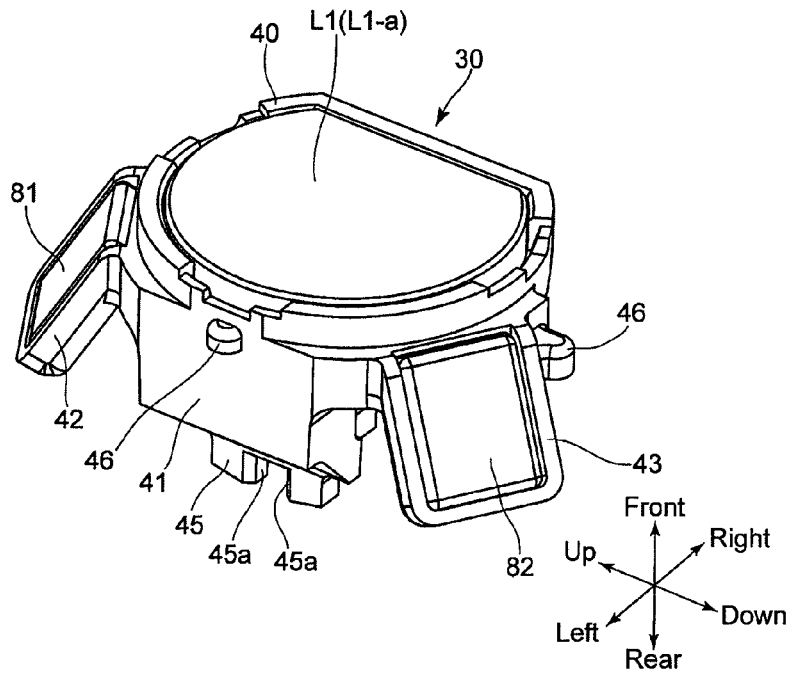
FIG. 14 is a front perspective view of the first lens frame, the first lens element and other elements.
Figure 18:
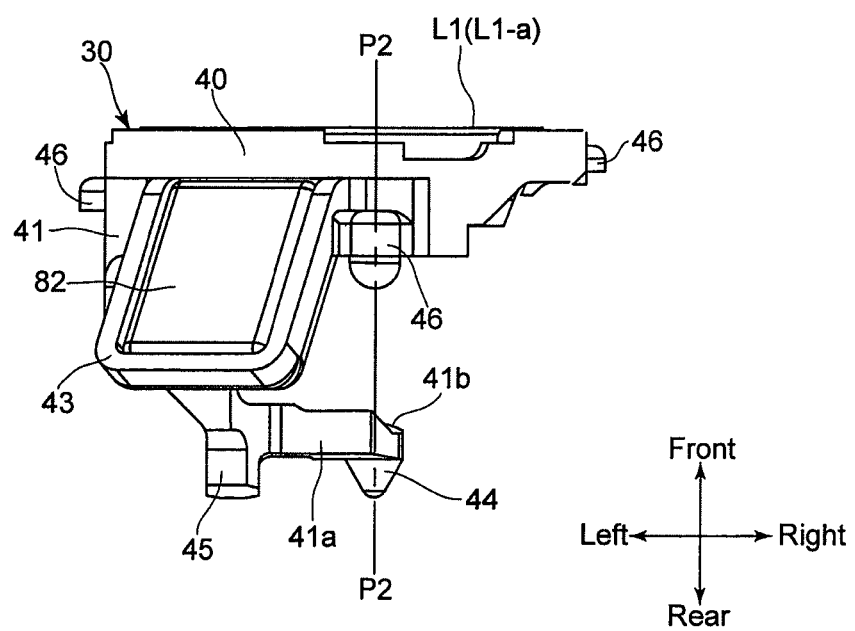
FIG. 18 is a view of the elements shown in FIG. 14 that include the first lens frame, viewed from the bottom of the imaging unit.
Figure 19:
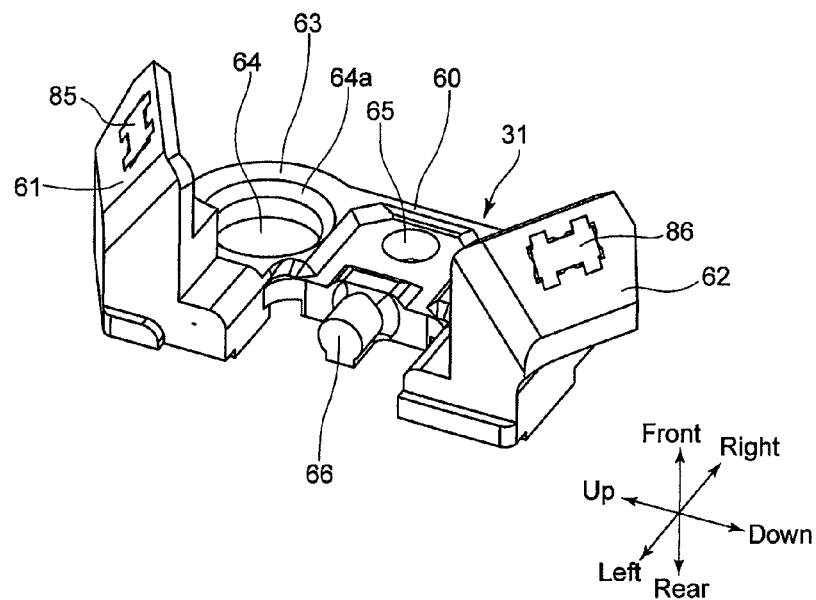
FIG. 19 is a front perspective view of the sensor holder.
Figure 20:
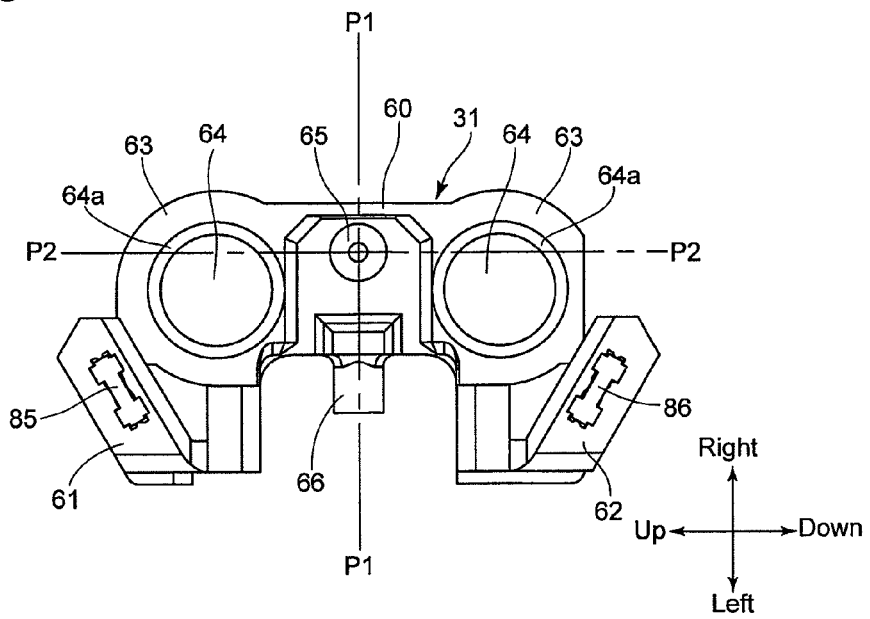
FIG. 20 is a front elevational view of the sensor holder, viewed from the front of the imaging unit.
Figure 21:
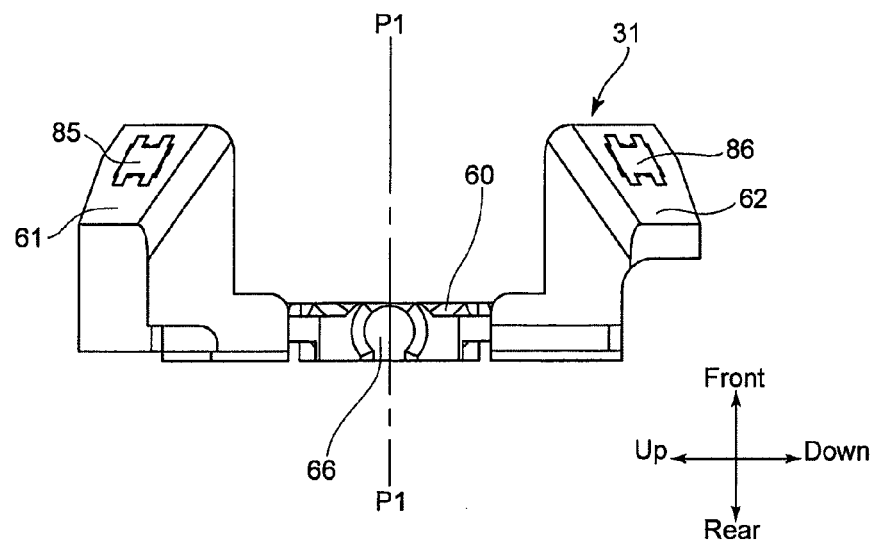
FIG. 21 is a side elevational view of the sensor holder, viewed from the left side of the imaging unit.

As shown in FIGS. 14 through 18, the first lens frame 30 is provided with a frame-shaped lens holding portion 40, a support portion 41 and a pair of magnet holding portions 42 and 43. The first lens element L1 is fixedly fitted into the lens holding portion 40. Each of the support portion 41 and the magnet holding portions 42 and 43 is connected to the outer periphery of the lens holding portion 40 at positions closer to the left than the second reference plane P2. The support portion 41 extends rearward from a portion of the outer periphery of the lens holding portion 40 between the magnet holding portions 42 and 43 and is provided in the vicinity of the rear end of the support portion 41 with a cantilever-shaped pivot arm 41a, which extends rightward in a direction to approach the second reference plane P2 (the first optical axis O1) (see FIGS. 3, 5, 13, 17 and 18). The pivot arm 41a is provided at the end (the right end) thereof with a pivot projection (supported portion) 44 which projects rearward. The pivot projection 44 is in the shape of a cone which reduces the diameter thereof in the rearward direction, i.e., tapers in the rearward direction, and the tip of the conical pivot projection 44 is smoothed out into a hemisphere (spherical convex surface). As shown in FIGS. 3, 13 and 18, the pivot arm 41a is further provided, at the end thereof on the opposite side (the front side) of the pivot arm 41a from the pivot projection 44, with a curved surface 41b. The curved surface 41b is formed into a spherical surface which is a convex surface that faces forwardly, and the center of the surface of an imaginary sphere including this spherical surface is coincident with the spherical-swinging center A1.

Each of the magnet holding portions 42 and 43 is formed to extend obliquely rearwards from the lens holding portion 40 and to be angled so as to increase the distance from the first optical axis O1 thereto in a direction away from the lens holding portion 40, with respect to a direction toward the rear end thereof (i.e., in the rearward direction). In a state where the first lens frame 30 is at the image-stabilizing initial position, the magnet holding portions 42 and 43 are positioned on the opposite side of the first reference plane P1 to be substantially symmetrical with respect to the first reference plane P1. The permanent magnet 81 is fitted into and held by a recess formed in the magnet holding portion 42, and the permanent magnet 82 is fitted into and held by a recess formed in the magnet holding portion 43.

The first lens frame 30 is further provided, at the rear end of the support portion 41 (in the vicinity of the base end of the pivot arm 41a), with a guide portion 45. The guide portion 45 has a groove which is open toward the rear, and a pair of facing surfaces 45a form the side wall surfaces of this groove. The pair of facing surfaces 45a are flat surfaces which are substantially parallel to each other. In a state where the first lens frame 30 is at the image-stabilizing initial position, the pair of facing surfaces 45a are positioned on the opposite side of the first reference plate P1 to be substantially symmetrical with respect to the first reference plane P1. As can be seen from FIG. 18, the pivot projection 44 and the guide portion 45 are provided at substantially the same position with respect to the forward and rearward directions.

The first prism L11, which is held by the prism holding frame 23a of the housing 20, is positioned so that the incident surface L11-a lies on the first optical axis O1 and faces forward and so that the exit surface L11-b lies on the second optical axis O2 and faces rightward. An installation space 23b is formed in the housing 20 and provided on the left and rear sides of the prism holding frame 23a. The prism holding frame 23a is provided with a pair of support seats (adjuster/abutment portions) 25 which project rearward, and the prism holding frame 23a is further provided, at the ends of the pair of support seats 25 that face rearward, with a pair of hollow-cylindrical extended protrusions (adjuster/protrusions) 26 which protrude rearward. The pair of support seats 25 are positioned on the opposite sides of the first reference plane P1 to be symmetrical with respect to the first reference plane P1, and the pair of hollow-cylindrical extended protrusions 26 are positioned on the opposite sides of the first reference plane P1 to be substantially symmetrical with respect to the first reference plane P1. Each extended protrusion 26 is provided at the base end (front end) thereof with a tapered surface 26a, having the shape of a truncated cone which reduces the diameter thereof in the direction toward the end of the associated extended protrusion 26 (see FIGS. 5, 24 and 30). As shown in FIGS. 5, 24, 25 and 30, a screw hole 25a, the axis of which extends in the forward/rearward direction, is formed in the each support seat 25, and the end (rear end) of each screw hole 25a is open at the end surface of the associated extended protrusion 26. In addition to each support seat 25 and each extended protrusion 26, the housing 20 is further provided on the prism holding frame 23a with a spring support projection 27 which projects rearward (FIGS. 3 and 5). In addition, the prism holding frame 23a is provided, on the surface thereof which faces leftward, with a biasing-arm support projection 28 and a pair of holding walls 29 which are positioned on the opposite sides of the biasing-arm support projection 28 (see FIGS. 4 and 6). The spring support projection 27 and the biasing-arm support projection 28 lie in the first reference plane P1.

As shown in FIG. 3, a biasing arm 36 is provided in the installation space 23b of the housing 20. The biasing arm 36 is provided with a support plate portion 36a which is bent into an L-shape and a stepped pressing portion 36b which is formed at an end of the support plate portion 36a as shown in FIG. 6. Two engaging holes 36c and 36d are formed in the two walls of the support plate portion 36a, respectively, that are substantially orthogonal to each other. The biasing arm 36 is supported by the housing 20 with the biasing-arm support projection 28 engaged in the engaging hole 36c and with the spring support projection 27 inserted into the engaging hole 36d (see FIG. 3). Fitting a coil spring 37 onto the spring support projection 27 in advance of the installation of the biasing arm 36 and installing the biasing arm 36 to the housing 20 causes one end and the other end of the coil spring 37, the axis of which extends in the forward and rearward directions, to come into contact with the prism holding frame 23a and the support plate portion 36a, respectively. The engaging hole 36c and the biasing-arm support projection 28 are formed to allow the biasing arm 36 to move slightly relative to the housing 20 in the forward and rearward directions, and also the engaging hole 36d and the spring support projection 27 are formed to allow the biasing arm 36 to move slightly relative to the housing 20 in the forward and rearward directions (the engaging hole 36c is a hole elongated in the forward and rearward directions, and the engaging hole 36d is a through-hole extending in the forward and rearward directions); the biasing arm 36 is biased rearward by the biasing force of the coil spring 37. Movement of the biasing arm 36 in the biasing direction of the coil spring 37 is limited (the biasing arm 36 is prevented from coming off the housing 20) by the engagement of the front end of the engaging hole 36c with the biasing-arm support projection 28. In addition, holding of the support plate portion 36a between the pair of holding walls 29 prevents the biasing arm 36 from moving in the upward and downward directions relative to the housing 20.

As shown in FIGS. 19 through 23, the sensor holder 31 is provided with a base plate portion 60 and a pair of sensor support projections (detector supporters) 61 and 62 which are formed to project forwardly from the base plate portion 60. The pair of sensor support projections 61 and 62 are provided with two inclined surfaces which face the magnet holding portions 42 and 43 of the first lens frame 30, respectively, when the sensor holder 31 and the first lens frame 30 are combined, as shown in FIGS. 7 through 13. The Hall sensor 85 and the Hall sensor 86 are fitted into two recesses formed on the two inclined surfaces of the pair of sensor support projections 61 and 62 to be supported thereby. The Hall sensors 85 and 86 are electrically connected to a control circuit (not shown) which controls the operation of the imaging unit 10 so that information on the outputs of the Hall sensors 85 and 86 is transmitted to the control circuit.

Figure 22:
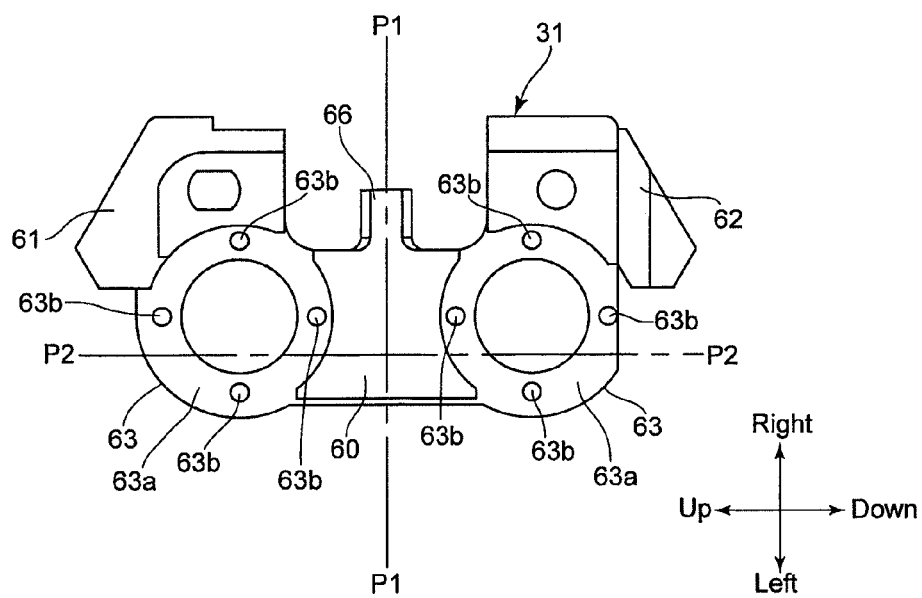
FIG. 22 is a rear elevational view of the sensor holder, viewed from the rear of the imaging unit.
Figure 23:
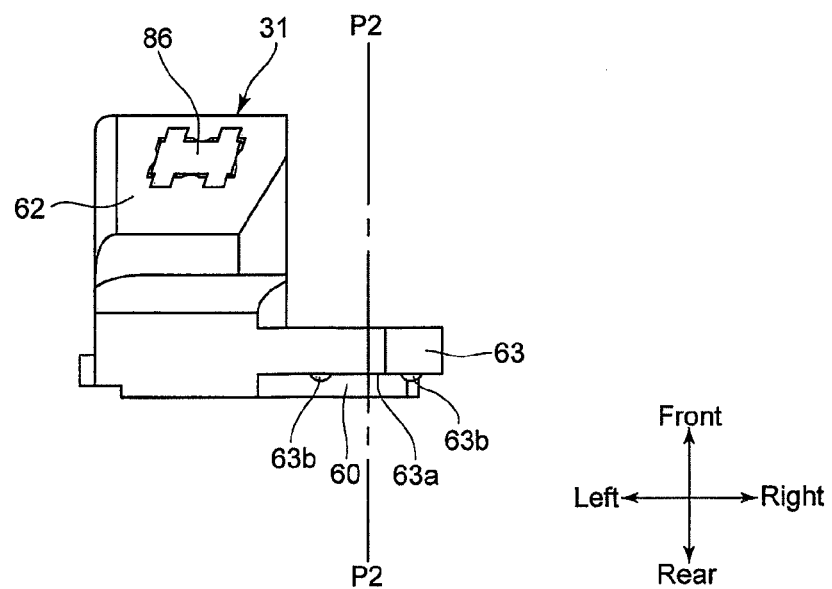
FIG. 23 is a view of the sensor holder, viewed from the bottom of the imaging unit.
Figure 24:
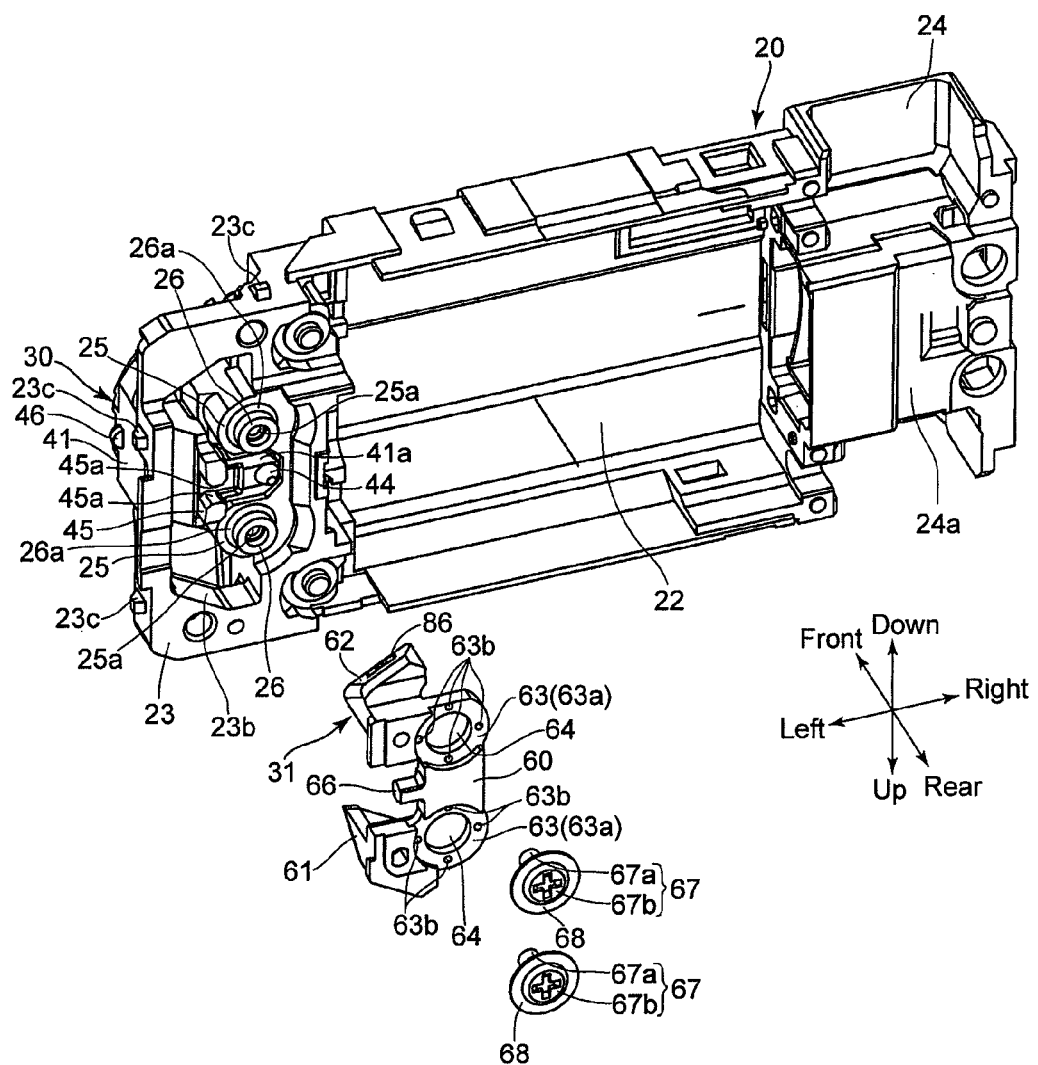
FIG. 24 is a rear perspective view of the housing, the sensor holder, the first lens frame and other elements of the imaging unit, illustrating a process of installing the sensor holder to the housing.
Figure 25:
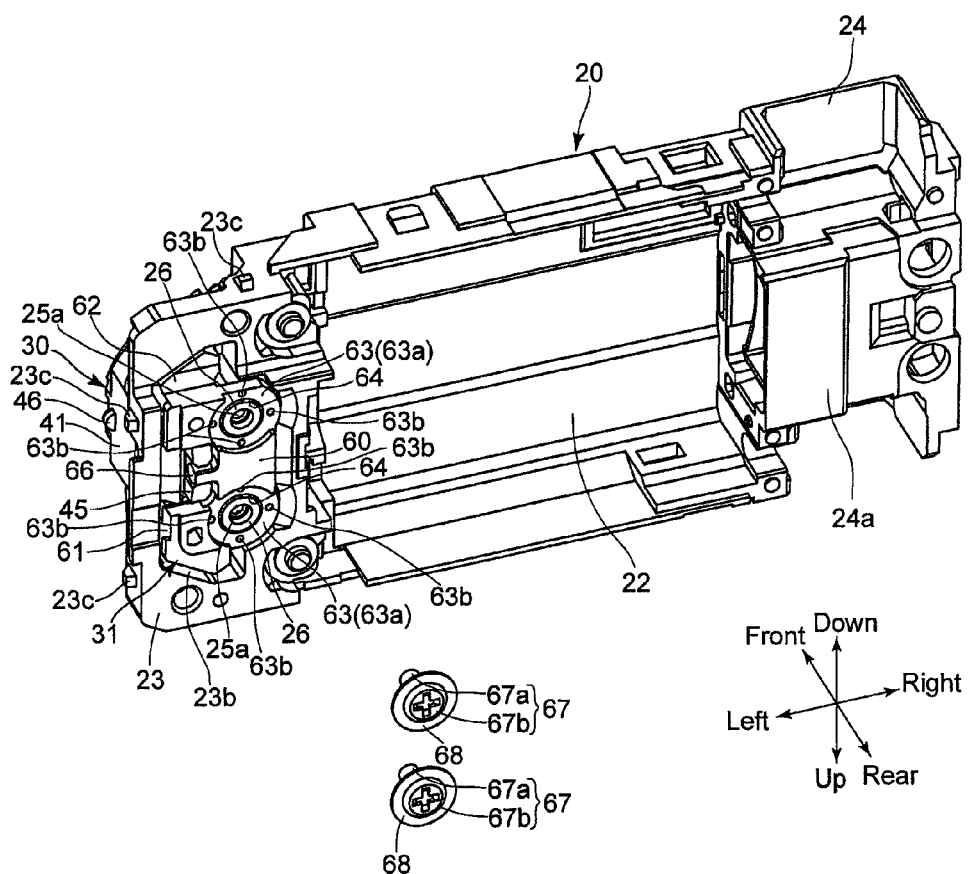
FIG. 25 is a rear perspective view of the housing, the sensor holder, the first lens frame and other elements of the imaging unit, illustrating a process of installing the sensor holder to the housing.

The base plate portion 60 of the sensor holder 31 is provided with a pair of mounting portions 63, a pair of circular loose-engaging holes (adjuster/holes) 64, a pivot recess (spherical-swinging operation support) 65, and a rotation prevention projection (rotation preventer) 66. The pair of mounting portions 63 are mounted to the pair of support seats 25 of the housing 20. The pair of circular loose-engaging holes 64 are formed through the pair of mounting portions 63 in the forward and rearward directions. The pivot recess 65 is positioned between the pair of mounting portions 63. Each mounting portion 63 is provided at the front end of the inner peripheral surface of the associated loose-engaging hole 64 with a tapered surface 64a, having a conical shape which progressively increases the inner diameter thereof in the forward direction (in the direction toward the front surface of the mounting portion 63) (see FIGS. 19 and 20). As shown in FIGS. 22 through 25, each mounting portion 63 is provided at the rear end thereof with a rear surface 63a which is recessed forward from the rearmost part of the base plate portion 60 (i.e., formed into a forward-stepped portion). The rear surface 63a of each mounting portion 63 is formed in an annular range substantially surrounding the associated loose-engaging hole 64, and four support projections 63b are formed on each rear surface 63a (i.e., a total of eight support projections 63b are formed on the two rear surfaces 63a) to project rearward therefrom. Each support projection 63b is formed into a hemispherical projection (see FIG. 23), and the four support projections 63b are arranged on each rear surface 63a circumferentially at substantially equi-angular intervals (intervals of 90 degrees) about the associated loose-engaging hole 64 (FIGS. 22, 24 and 25).

The pivot recess 65 is a recess having a conical-shaped inner surface which allows the pivot projection 44 of the first lens frame 30 to fit into, and the innermost base portion of the pivot recess 65 is formed into a spherical shape (concave spherical shape) which corresponds to the end shape (spherical tip) of the pivot projection 44. The rotation prevention projection 66 is a rod-like projection, the axis (elongated direction) of which extends in a radial direction of the pivot recess 65. The rotation prevention projection 66 is substantially uniform in cross-sectional shape throughout its length (in the axial direction thereof). The rotation prevention projection 66 is inserted in between the pair of facing surfaces 45a of the guide portion 45 of the first lens frame 30 (see FIGS. 7, 8, 10, 11, 25, 26 and 29), with the pivot projection 44 fitted into the pivot recess 65 as shown in FIGS. 3 and 13. The guide portion 45 is allowed to move (slide) relative to the rotation prevention projection 66 along the first reference plane P1 (in the forward/rearward directions and the leftward/rightward directions of the imaging unit 10) and is prevented from moving relative to the rotation prevention projection 66 in a direction to connect the pair of facing surfaces 45a (the upward and downward directions of the imaging unit 10).

Figure 30:
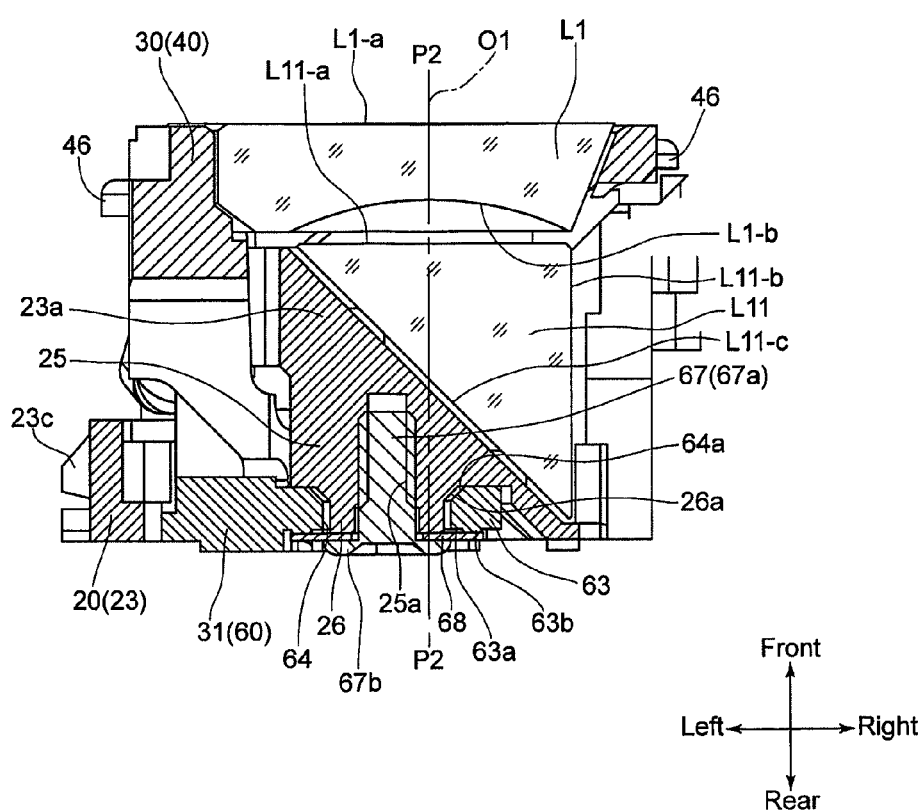
FIG. 30 is a sectional view taken along the line XXX-XXX shown in FIG. 29.

As shown in FIG. 24, the sensor holder 31 is inserted into the installation space 23b of the first support portion 23 in the forward direction from the rear side with the front surfaces (on which the tapered surfaces 64a are formed) of the pair of mounting portions 63 facing the pair of support seats 25 of the housing 20. At this stage, in the case where the rear support plate 21 has been already mounted onto the housing 20, the sensor holder 31 can be inserted into the installation space 23b through the installation opening 21a as shown in FIG. 5. Inserting the sensor holder 31 into the installation space 23b causes the pair of extended protrusions 26, which are formed at the ends of the pair of support seats 25, to enter the pair of loose-engaging holes 64, respectively, as shown in FIGS. 25 and 30. During this insertion operation, the tapered surfaces 64a of the pair of loose-engaging holes 64 serve as guide portions which guide the pair of extended protrusions 26 into the pair of loose-engaging holes 64, which makes it easy for the pair of extended protrusions 26 to be inserted into the pair of loose-engaging holes 64 with no need to make precise alignment between each extended protrusion 26 and the associated loose-engaging hole 64. Upon the sensor holder 31 being inserted into the installation space 23b until the front surfaces of the pair of mounting portions 63 come into contact with the ends of the pair of support seats 25, the sensor holder 31 is prevented from moving further forward (from being inserted further forward). Namely, by inserting the sensor holder 31 into the installation space 23b until the front surfaces of the pair of mounting portions 63 come into contact with the ends of the pair of support seats 25, the position of the sensor holder 31 in a direction along the first optical axis O1 (in the forward and rearward direction of the imaging unit 10) is defined. As shown in FIGS. 25 and 30, the diameters of the pair of extended protrusions 26 and the pair of loose-engaging holes 64 are set so that the pair of extended protrusions 26 can be loosely fitted into the pair of loose-engaging holes 64 with a predetermined radial clearance being formed between each extended protrusion 26 and the associated loose-engaging hole 64. In addition, the outer diameters of the pair of tapered surfaces 26a and the inner diameters of the tapered surfaces 64a of the pair of loose-engaging holes 64 in this mutually facing state, in which each extended protrusion 26 and the associated loose-engaging hole 64 face each other, are set so that each extended protrusion 26 is loosely engaged in the associated loose-engaging hole 64 with a sufficient margin (see FIG. 30). Therefore, in a state where the pair of mounting portions 63 are simply made to abut against the ends of the pair of support seats 25, the sensor holder 31 can move relative to the housing 20 along a plane orthogonal to the first optical axis O1 within the allowable range defined by the clearance between the inner edge of each loose-engaging hole 64 and the outer periphery of the associated extended protrusion 26.

The sensor holder 31 is installed in the installation space 23b of the housing 20 and is fixed to the housing 20 with two set screws 67. Each set screw 67 is provided with a shaft portion (screw shaft portion) 67a, on which a thread (male thread) is formed, and a head 67b which is fixed to an end of the shaft portion 67a and is greater in diameter than that of the shaft portion 67a; an annular washer 68 is fitted on the shaft portion 67a of each set screw 67 to be supported on the surface (the upper surface with respect to FIGS. 30 and 31) of the head 67b from which the shaft portion 67a projects. The washers 68 are greater in diameter than the heads 67b of the set screws 67. As shown in FIGS. 26 through 30, the sensor holder 31 is supported in the installation space 23b by sandwiching each mounting portion 63 of the base plate portion 60 between the associated washer 68 and support seat 25 by screwing the shaft portions 67a of the two set screws 67 into the screw holes 25a, which are formed in the pair of support seats 25, from the rear. In this state where the sensor holder 31 is thus supported, the pair of sensor support projections 61 and 62 are positioned on the left-hand side of the prism holding frame 23a, the base plate 60 is positioned behind the prism holding frame 23a, and the pivot recess 65 that is formed on the base plate 60 lies on an extension of the first optical axis O1 (see FIGS. 3 and 13). The central axis of the rotation prevention projection 66 lies on the first reference plate P1 and is positioned on the left-hand side of the pivot recess 65.

The mounting structure of the sensor holder 31 to the housing 20 will be further discussed in detail. The four support projections 63b, each having a hemispherical shape, are formed on the rear surface 63a of each mounting portion 63 of the sensor holder 31 to project rearward therefrom as described above. When mounting the sensor holder 31 to the housing 20, screwing each set screw 67 into the associated screw hole 25a causes the associated washer 68 to come into contact with the associated four support projections 63b. Since the sensor holder 31 is prevented from moving forward by engagement of the front surfaces of the pair of mounting portions 63 of the sensor holder 31 with the ends of the pair of support seats 25, screwing down each set screw 67 to thereby reduce the gap between each support seat 25 and the associated washer 68 in the forward and rearward directions causes the four support projections 63b on each rear surface 63a to be pressed and resiliently deformed by the associated washer 68 in a direction (collapsing direction) to reduce the amount of projection of each support projection 63b from the rear surface 63a of the associated support seat 25. This causes the sensor holder 31 to be biased forward due to the resilient force of the support projections 63b on each rear surface 63a, thus causing the front surfaces of the pair of mounting portions 63 of the sensor holder 31 to be pressed against the ends of the pair of support seats 25. As shown in FIG. 30, in a state where the front surfaces of the pair of mounting portions 63 are in contact with the ends of the pair of support seats 25, the ends of the pair of extended protrusions 26 project rearward from the pair of loose-engaging holes 64, respectively, and the screw-in limit of each set screw 67 is defined by engagement of the associated washer 68 with the end of the associated extended protrusion 26 (the minimum clearance between each support seat 25 and the associated washer 68 in the forward and rearward directions is defined). The pair of loose-engaging holes 64 and the pair of extended protrusions 26 are loosely engaged with each other with a predetermined radial clearance between each extended protrusion 26 and the associated loose-engaging hole 64 as described above, and the position of the sensor holder 31 relative to the housing 20 can be adjusted along a plane orthogonal to the first optical axis O1 in a state where each set screw 67 has reached the screw-in limit thereof. During this adjustment, the sensor holder 31 sandwiched between each support seat 25 and the associated washer 68 with a minimum clearance therebetween is stably held by the biasing force created by the resilient deformation of the support projections 63b on each rear surface 63a. Accordingly, when the position of the sensor holder 31 relative to the housing 20 is adjusted along a plane orthogonal to the first optical axis O1, an appropriate frictional force occurs by the aforementioned biasing force, and the presence of this frictional force makes it possible to move the sensor holder 31 stably relative to the housing 31 with a certain amount of driving force when the position of the sensor holder 31 is adjusted with the use of a jig or the like. After completion of the operation of setting the position of the sensor holder 31, the sensor holder 31 is bonded to the housing 20 with adhesive. In this bonding operation also, the application of the aforementioned biasing force to the sensor holder 31 prevents the sensor holder 31 from deviating from the set position, which makes it possible to fix the sensor holder 31 to the housing 20 with precision. Namely, the application of a biasing force (the resiliency of each support projection 63b) to the sensor holder 20 facilitates the adjustment of the position of the sensor holder 31 relative to the housing 20 and facilites the precise fixing of the sensor holder 31 to the housing 20, thus making it possible to set the position of the sensor holder 31 relative to the housing 20 with high precision.

Figure 31:
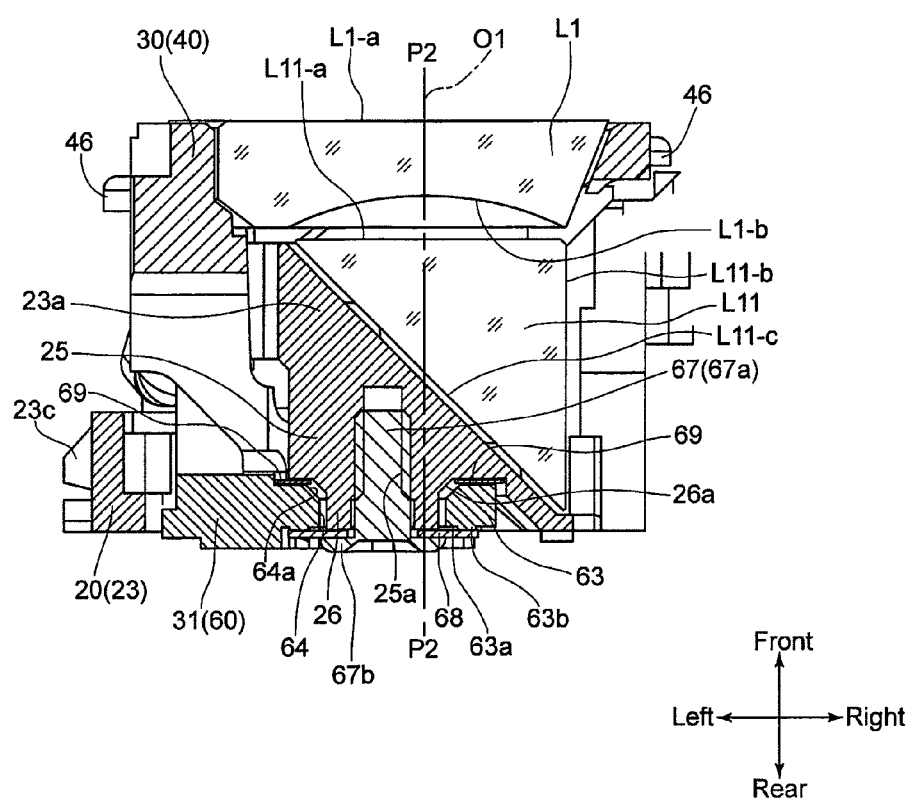
FIG. 31 is a view similar to that of FIG. 30, illustrating the case where a spacer is installed in between a support seat formed on the housing and a mounting portion formed on the sensor holder, taken along the same plane as FIG. 30.

In addition, instead of making the pair of support seats 25 of the housing 20 and the pair of mounting portions 63 of the sensor holder 31 come in direct contact with each other, it is also possible to insert a spacer (adjuster) 69 in between each support seat 25 and the associated mounting portion 63 as shown in FIG. 31 to adjust the position of the sensor holder 31 relative to the housing 20 in a direction along the first optical axis O1. In this case also, it is desirable to create a biasing force for pressing the sensor holder 31 against the pair of support seats 25 by making each washer 68 press against the associated four support projections 63b to thereby resiliently deform the support projections 63b by tightening each set screw 67.

Figure 7:
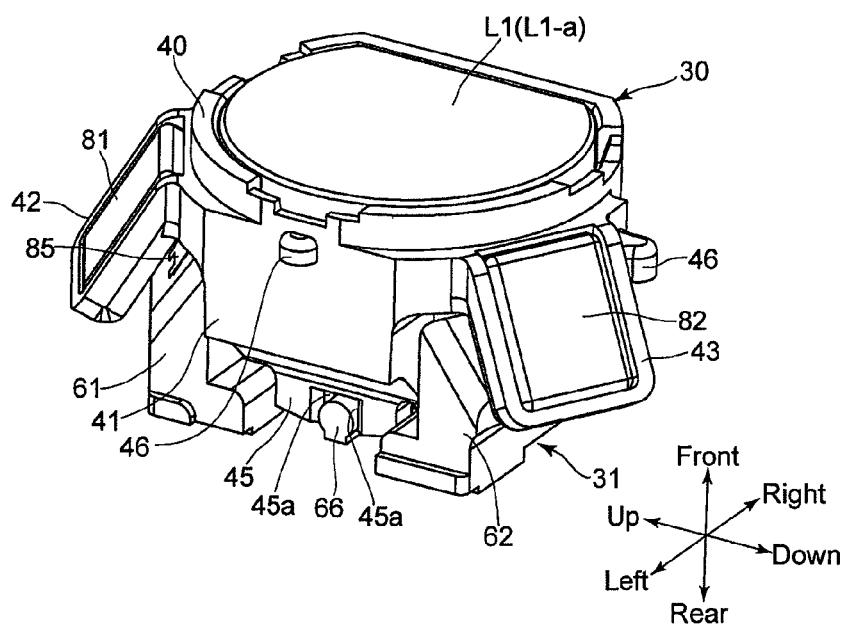
FIG. 7 is a front perspective view of a combination of the first lens frame and a sensor holder.
Figure 8:
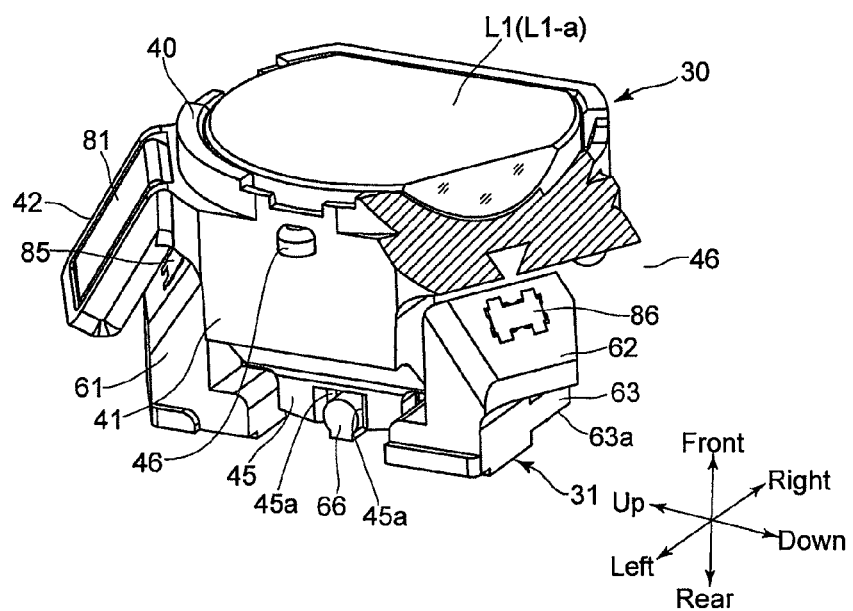
FIG. 8 is a front perspective view, partly in cross section, of the combination of the first lens frame and the sensor holder, wherein a part of the first lens frame shown in FIG. 7 is shown as a cross section.

The first lens frame 30 is supported by the housing 20 via the sensor holder 31. As shown in FIG. 3, the first lens frame 30 is mounted into the housing 20 by inserting the support portion 41 into the installation space 23b so that the pivot arm 41a is positioned between the prism holding frame 23a of the housing 20 and the base plate portion 60 of the sensor holder 31. The first lens frame 30 is supported by the sensor holder 31 with the pivot projection 44, which is formed on the pivot arm 41a, fitted into the pivot recess 65, which is formed in the sensor holder 31, and with the rotation prevention projection 66 inserted in between the pair of facing surfaces 45a of the guide portion 45 of the first lens frame 30. The curved surface 41b of the pivot arm 41a, which is formed on the opposite side of the pivot arm 41a from the pivot projection 44, is in contact with the stepped pressing portion 36b of the biasing arm 36, and the biasing arm 36 is pressed forward against the biasing force of the coil spring 37. This causes the biasing arm 36 that receives the repulsive force of the coil spring 37 to press the end of the pivot projection 44 against the bottom of the pivot recess 65, so that the first lens frame 30 that holds the first lens element L1 is stably supported by the sensor holder 31 while being capable of performing the spherical swinging operation. In this supported state of the first lens frame 30, the first lens element L1 is positioned in front of the incident surface L11-a of the first prism L11. In addition, as shown in FIGS. 7, 8 and 10, the magnet holding portions 42 is adjacent to the sensor support projection 61 of the sensor holder 31 and the magnet holding portions 43 is adjacent to the sensor support projection 62 of the sensor holder 31.

Figure 26:
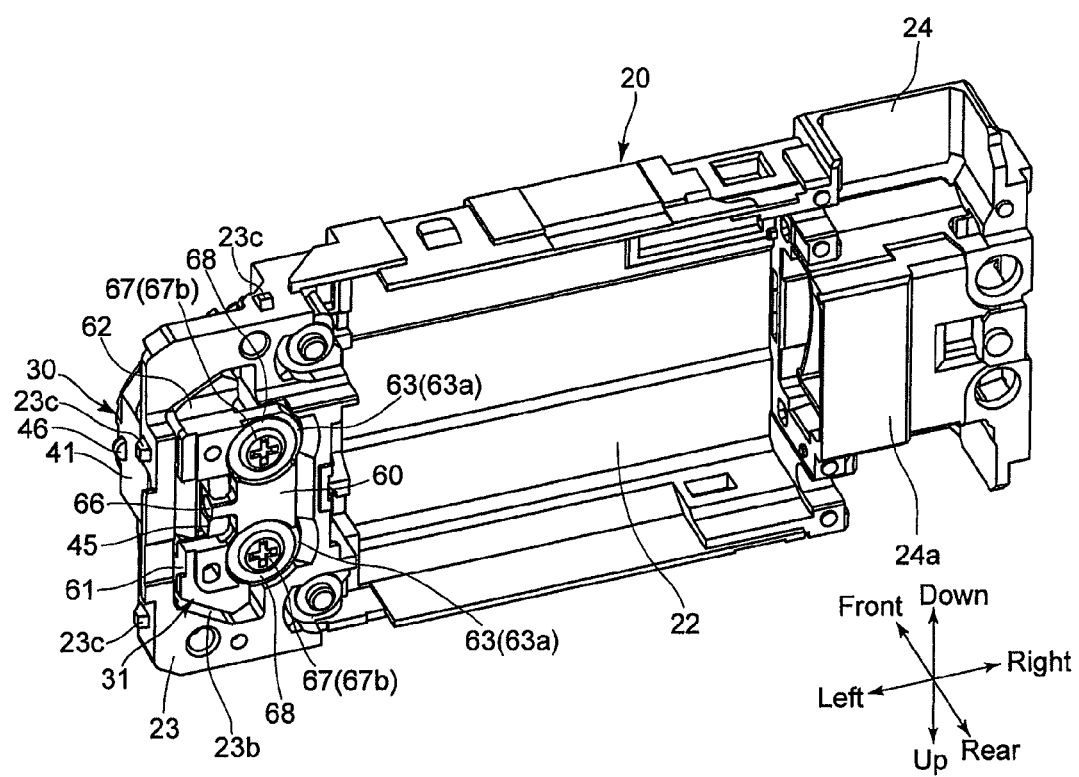
FIG. 26 is a rear perspective view of the housing, the sensor holder, the first lens frame and other elements of the imaging unit, illustrating a process of installing the sensor holder to the housing.
Figure 27:
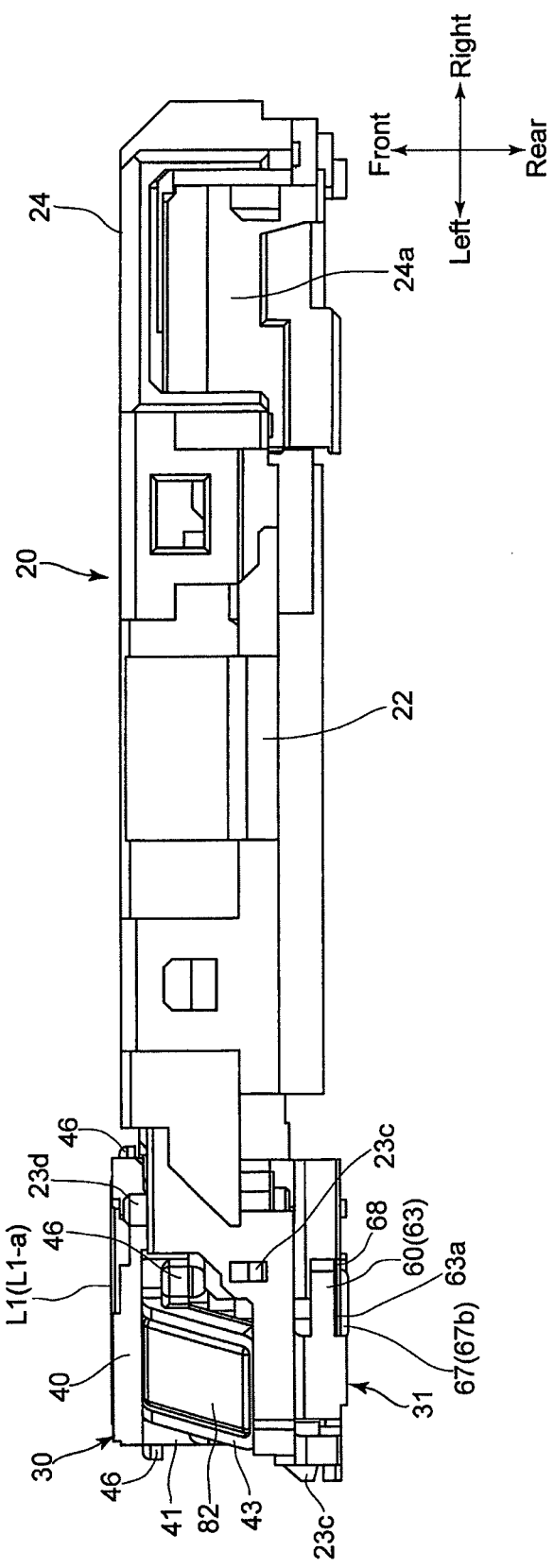
FIG. 27 is a bottom view of the elements of the imaging unit shown in FIGS. 24, 25 and 26, showing a state where the first lens frame and the sensor holder have been installed to the housing, viewed from the bottom of the imaging unit.
Figure 28:
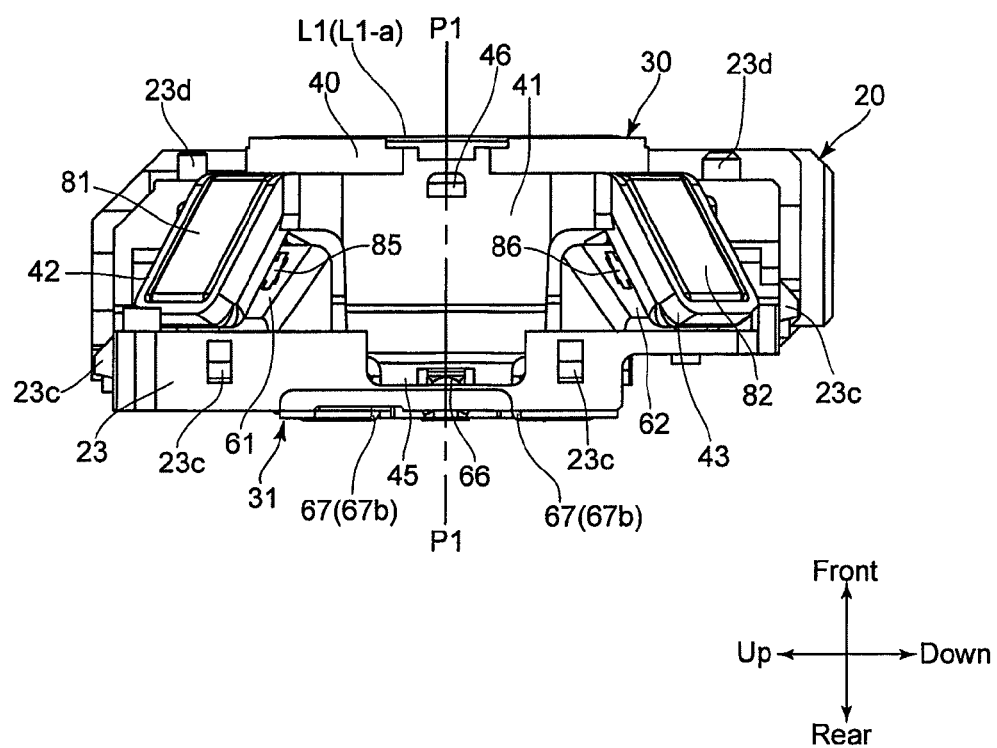
FIG. 28 is a side elevational view of the elements of the imaging unit shown in FIGS. 24, 25 and 26, showing a state where the first lens frame and the sensor holder have been installed to the housing, viewed from the left side of the imaging unit.
Figure 29:
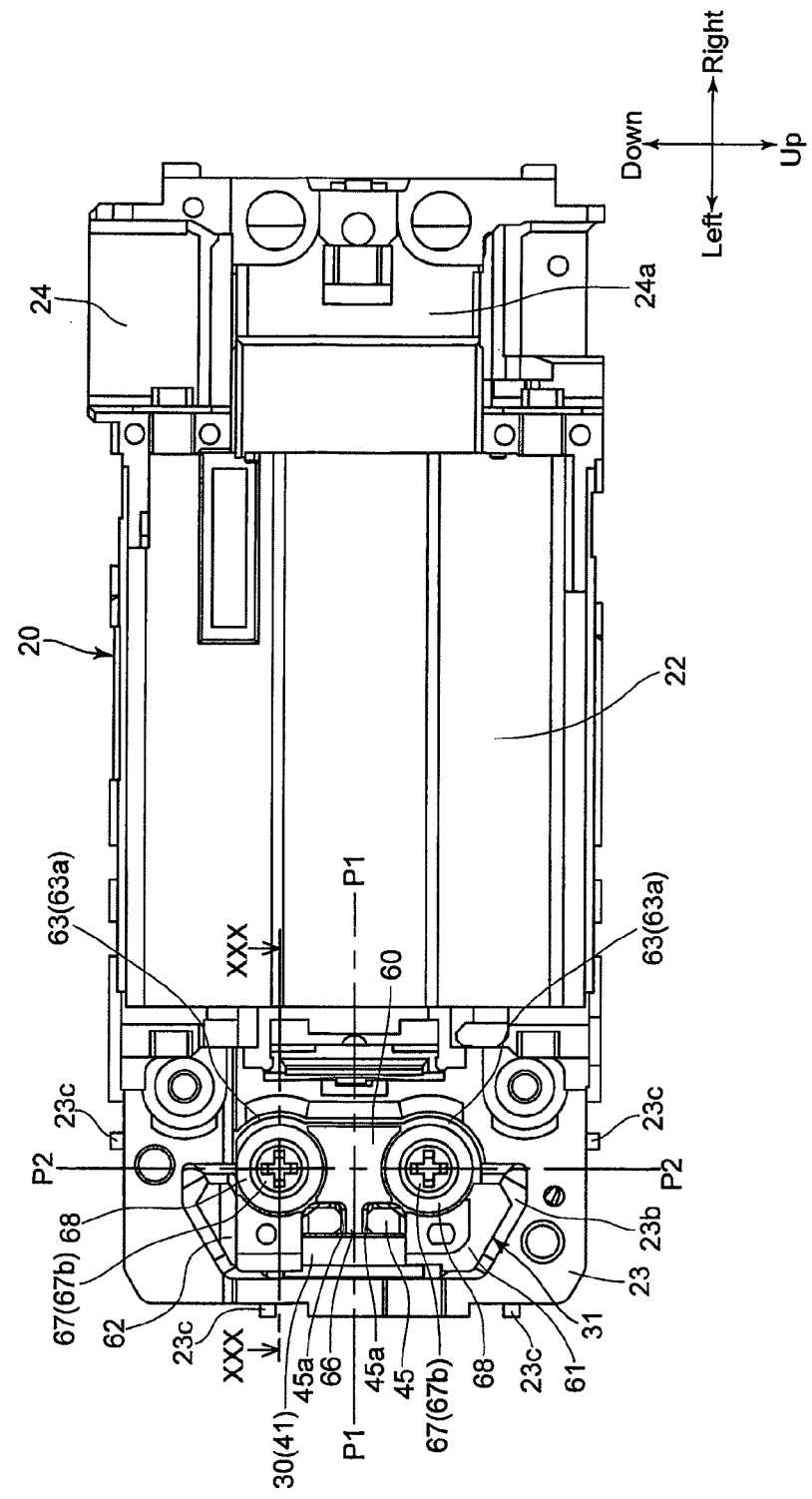
FIG. 29 is a rear elevational view of the elements of the imaging unit shown in FIGS. 24, 25 and 26, showing a state where the first lens frame and the sensor holder have been installed to the housing, viewed from the rear of the imaging unit.

As shown in FIGS. 24 through 26, it is desirable to firstly insert the first lens frame 30 into the first support portion 23 of the housing 20 from the front, subsequently install the sensor holder 31 to the first support portion 23 of the housing 20 from the rear, and thereafter tighten the two set screws 67 in that order when the first lens frame 30 and the sensor holder 31 are installed to the housing 20. In addition, a position adjusting operation and a fixing operation are performed on the sensor holder 31 to fix (define) the support position of the first lens frame 30.

As shown in FIGS. 1, 2 and 4 through 6, the cover member 32 is shaped to cover the first support portion 23 of the housing 20 from the front. The cover member 32 is provided with a side wall 70 and a front wall 71. The side wall 70 covers the upper, lower and left sides of the first support member 23, and the front wall 71 covers the front of the first support portion 23. A photographing aperture 72, through which the first lens element L1 is exposed, is formed in the front wall 71. The side wall 70 is provided with a plurality of engaging holes 73 and the front wall 71 is provided with a plurality of engaging holes 74. The first support portion 23 of the housing 20 is provided with a plurality of engaging projections 23c and a plurality of projections 23d which are engaged in the engaging holes 73 and the engaging holes 74, respectively. The cover member 32 is fixedly supported by the housing 20 by fitting the cover member 32 onto the first support member 23 while engaging each engaging hole 73 and 74 of the cover member 32 with the associated engaging projection 23c or 23d.

The cover member 32 is provided with two coil insertion holes 75 on the boundary between the side wall 70 and the front wall 71. The two coil support members 87 and 88, which support the two coils 83 and 84, are mounted onto the cover member 32 so as to cover the outer sides of the two coil insertion holes 75 and to insert the two coils 83 and 84 into the two coil insertion holes 75, respectively. In a state where the cover member 32 is mounted to the housing 20, the coils 83 and 84 are positioned to face the permanent magnets 81 and 82, respectively (see FIG. 15). The passage of current through the coils 83 and 84 is controlled by a control circuit (not shown) which controls the overall operation of the imaging unit 10.

The first lens frame 30 is provided, on the outer peripheral surface thereof at substantially equi-angular intervals (intervals of 90 degrees) in the circumferential direction about the first optical axis O1, with four position limit projections 46. When the first lens frame 30 is positioned at the image-stabilizing initial position, the pair of position limit projections 46 which are laterally arranged lie on the first reference plane P1 and the pair of position limit projections 46 which are vertically arranged lie on the second reference plane P2 as shown in FIGS. 9 and 15. The cover member 32 is provided on the inner side thereof with four position limit surfaces 76 which face the four position limit projections 46 of the first lens frame 30 when the cover member 32 is mounted to the housing 20.

In a state where each member associated with supporting and driving (moving) of the first lens element L1 is installed to the housing 20, the first lens frame 30 is supported on the sensor holder 31, which is connected to the housing 20, via the engagement between the pivot projection 44 and the pivot recess 65. As described above, the pivot recess 65 is a recess which is open at the front side of the base plate portion 60 of the sensor holder 31 and has a conical-shaped inner surface which progressively reduces the inner diameter thereof in the direction toward the base of the recess, and the innermost base portion of the pivot recess 65 is formed having a concave spherical surface. This concave spherical surface is a part of the surface of a sphere with its center on the spherical-swinging center A1. The pivot projection 44 is a projection having a conical outer surface which progressively reduces the diameter thereof in the direction toward the end of the pivot projection 44, and the end of the pivot projection 44 is formed having a convex spherical surface. This convex spherical surface is a part of the surface of a sphere with its center on the spherical-swinging center A1. The biasing arm 36 that is biased by the coil spring 37 provides a force which presses the end of the pivot projection 44 against the bottom of the pivot recess 65, and the first lens frame 30 is supported to be capable of spherically swinging about the spherical-swinging center A1 (inclining the pivot projection 44 relative to the pivot recess 65) by being guided by the contacting portion between the pivot projection 44 and the pivot recess 65. Since the end of the pivot projection 44 forms part of a spherical surface about the spherical-swinging center A1, this spherical swinging operation is performed while changing the point of contact between the pivot projection 44 and the pivot recess 65 without changing the position of the spherical-swinging center A1. As can be seen from FIGS. 3 and 13, the conical inner surface of the pivot recess 65 is formed into the shape of a circular cone having a greater central angle than that of the conical outer surface of the pivot projection 44, thereby allowing the first lens frame 30 to perform the spherical swinging operation without interference. In addition, since the contacting portion between the pivot projection 44 and the pivot recess 65 forms part of a spherical surface about the spherical-swinging center A1 (the aforementioned convex spherical surface and the aforementioned concave spherical surface), and since the curved surface 41b of the pivot arm 41a forms part of a (another) spherical surface about the spherical-swinging center A1, when the first lens frame 30 performs the spherical swinging operation, the stepped pressing portion 36b of the biasing arm 36 does not move in the forward and rearward directions, so that the spring load of the coil spring 37 does not vary (the stepped pressing portion 36b of the biasing arm 36 gives a fixed degree of load onto the end of the pivot projection 44 in the forward/rearward direction and prevents no superfluous load from occurring in directions other than the forward/rearward direction). This makes it possible to achieve a stable and highly precise image-stabilizing control without the electromagnetic actuator (the permanent magnets 81 and 82 and the coils 83 and 84) exerting an adverse influence on the drive control of the first lens frame 30.

The guide portion 45 and the rotation prevention projection 66 serve as a rotation preventer which prevents the first lens frame 30 from rotating about the optical axis of the first lens element L1 while allowing the first lens frame 30 to perform the spherical swinging operation. The "optical axis of the first lens element L1" here refers to the optical axis of the first lens element L1 when the first lens frame 30 is at the image-stabilizing initial position (i.e., the optical axis O1 shown in the drawings) and the optical axis of the first lens element L1 while the first lens frame 30 performs the spherical swinging operation from the image-stabilizing initial position. The rotation prevention projection 66 is formed so that the axis (elongated direction) thereof extends in a radial direction of an imaginary line as an extension of the first optical axis O1, and the rotation prevention projection 66 is sandwiched between the pair of facing surfaces 45a of the guide portion 45 of the first lens frame 30. A portion of the outer peripheral surface of the rotation prevention projection 66 which is sandwiched between (is in sliding contact with) the pair of facing surfaces 45a of the guide portion 45 is formed into a cylindrical outer peripheral surface. The first lens element L1 is prevented from rotating about the optical axis of the first lens element L1 by the rotation prevention projection 66 being sandwiched between the pair of facing surfaces 45a of the guide portion 45. When the first lens frame 30 is at the image-stabilizing initial position, the guide portion 45 and the rotation prevention projection 66 prevent the first lens frame 30 from rotating about the first optical axis O1 because the optical axis of the first lens element L1 is coincident with the first optical axis O1 shown in the drawings. On the other hand, when the first lens frame 30 (the first lens element L1) is in an inclined position from the image-stabilizing initial position due to the spherical swinging operation, the guide portion 45 and the rotation prevention projection 66 prevent the first lens frame 30 from rotating about the optical axis of the first lens element L1 which is inclined.

The rotation prevention projection 66 is greater in length than each facing surface 45a in the leftward and rightward directions of the imaging unit 10, and the guide portion 45 is slidable in the leftward and rightward directions along the rotation prevention projection 66. In addition, the guide portion 45 has a depth allowing the guide portion 45 to slide relative to the rotation prevention projection 66 in the forward and rearward directions of the imaging unit 10. Additionally, the cylindrical outer peripheral surface of the rotation prevention projection 66 allows the guide portion 45 to swing (tilt) about the axis of the rotation prevention projection 66 (with the axis of the rotation prevention projection 66 as a point of support). Namely, if a plane in which the first lens frame 30 moves and which is parallel to the first reference plane P1 is defined as a first operating plane, the guide portion 45 can slide along the first operating plane in the forward and rearward directions and the leftward and rightward directions relative to the rotation prevention projection 66. In addition, if a plane in which the first lens frame 30 moves and which is orthogonal to the first reference plane P1 and parallel to the first optical axis O1 (i.e., parallel to the second reference plane P2) is defined as a second operating plane, in this second operating plane the guide portion 45 can both slide in the forward and rearward directions along the first optical axis O1 relative to the rotation prevention projection 66 and swing about the axis of the rotation prevention projection 66. In accordance with these movements, the guide portion 45 and the rotation prevention projection 66 can prevent the first lens frame 30 from rotating about the optical axis of the first lens element L1 without preventing the first lens frame 30 from performing the spherical swinging operation about the spherical-swinging center A1.

Each of the spherical-swinging center A1 of the first lens frame 30 and the axis of the rotation prevention protrusion 66 lies in the first reference plane P1. Therefore, when the first lens frame 30 is made to swing about the spherical-swinging center A1 along the second operating plane (a plane parallel to the second reference plane P2) from the image-stabilizing initial position, does not cause the position of each contact point of the guide portion 45 with the rotation prevention projection 66 to change from that when the first lens frame 30 is at the image-stabilizing initial position. Whereas, making the first lens frame 30 swing about the spherical-swinging center A1 along the first operating plane (a plane parallel to the first reference plane P1) causes the position of each contact point of the guide portion 45 with the rotation prevention projection 66 to change in the swing direction about the spherical-swinging center A1. The depth of the guide portion 45 in the forward and rearward directions is set so that the guide portion 45 does not come off the rotation prevention projection 66 during this movement of the first lens frame 30. Although the case where the first lens frame 30 swings in directions along the first operating plane and the second operating plane that are parallel to the first reference plane P1 and the second reference plane P2, respectively, has been discussed above, the first lens frame 30 can swing along an infinite number of planes, each including the first optical axis O1, in addition to the first operating plane and the second operating plane.

The driver which drives the first lens frame 30, supported as described above, so that the first lens frame 30 performs the spherical swinging operation is an electromagnetic actuator which includes two voice coil motors (VCMs). One of the two voice coil motors is configured of the permanent magnet 81 and the coil 83 and the other is configured of the permanent magnet 82 and the coil 84. Since the imaging unit 10 incorporates the aforementioned rotation preventer (the guide portion 45 and the rotation prevention projection 66) that prevents the first lens frame 30 from rotating about the optical axis of the first lens element L1 while allowing the first lens frame 30 to perform the spherical swinging operation about the spherical-swinging center A1, the first lens frame 30 can be driven to perform the spherical swinging operation precisely and stably by the two voice coil motors, which are different in driving-force acting direction.

The driver which drives the first lens frame 30 so that the first lens frame 30 performs the spherical swinging operation will be discussed hereinafter. Each of the permanent magnets 81 and 82 has a flat shape (flat rectangular parallelepiped), extending along a tangent plane that is tangent to a common imaginary spherical surface about the spherical-swinging center A1. Each of the coils 83 and 84 is a flat coil which is formed by winding a conductive wire in a plane that parallel to a tangent plane to a common imaginary spherical surface about the spherical-swinging center A1. The pair of coils 83 and 84 are positioned to be substantially symmetrical with respect to the first reference plane P1 at all times regardless of the spherical swinging operation of the first lens frame 30. Likewise, the pair of Hall sensors 85 and 86 are positioned to be substantially symmetrical with respect to the first reference plane P1 at all times regardless of the spherical swinging operation of the first lens frame 30. The pair of permanent magnets 81 and 82 are positioned to be substantially symmetrical with respect to the first reference plane P1 only when the first lens frame 30 is at the image-stabilizing initial position. The Hall sensor 85, the permanent magnet 81 and the coil 83 are aligned, in radial directions of an imaginary sphere with its center on the spherical-swinging center A1, in that order from the inner diameter side that is closer to the spherical-swinging center A1, and the coil 83 and the Hall sensor 85 are positioned in the magnetic field of the permanent magnet 81. The Hall sensor 86, the permanent magnet 82 and the coil 84 are aligned in that order from the inner diameter side that is closer to the spherical-swinging center A1, and the coil 84 and the Hall sensor 86 are positioned in the magnetic field of the permanent magnet 82.

Upon the coil 83, which is positioned in the magnetic field of the permanent magnet 81, being energized, a driving force is generated in a direction orthogonal to the pair of linear portions 83a of the coil 83 and orthogonal to the magnetic-pole boundary line Q1 of the permanent magnet 81 according to Fleming's left-hand rule. Similarly, upon the coil 84, which is positioned in the magnetic field of the permanent magnet 82, being energized, a driving force is generated in a direction orthogonal to the pair of linear portions 84a of the coil 84 and orthogonal to the magnetic-pole boundary line Q2 of the permanent magnet 82 according to Fleming's left-hand rule. The coils 83 and 84 are fixedly supported by the housing 20 via the cover member 32, and the permanent magnets 81 and 82 are supported by the first lens frame 30, which is a movable member, and accordingly, a driving force generated upon each coil 83 and 84 being energized acts as a force to move the first lens frame 30 along an imaginary spherical surface about the spherical-swinging center A1. Since the two voice coil motors (a combination of the permanent magnet 81 and the coil 83 and a combination of the permanent magnet 82 and the coil 84) are arranged at different positions in a circumferential direction about the first optical axis O1, the first lens frame 30 can be made to perform the spherical swinging operation in any arbitrary direction by a combination of controlling the passage of current through the two voice coil motors. As described above, the first lens frame 30 is prevented from rotating about the optical axis of the first lens element L1 when performing the spherical swinging operation due to the engagement between the guide portion 45 and the rotation prevention projection 66. In addition, the four position limit projections 46 that are formed on the first lens frame 30 and the four position limit surfaces 76 that are formed on the cover member 32 function as stoppers which define mechanical moving ends of the spherical swinging operation of the first lens frame 30. These stoppers prevent the first lens frame 30 from moving excessively to a point where each permanent magnet 81 and 82 and the associated coil 83 or 84 do not face each other, thus making it possible to control the position of the first lens frame 30 securely and reliably at all times by the two voice coil motors.

Variation in position of the permanent magnet 81 in accordance with the spherical swinging operation of the first lens frame 30 causes the output of the Hall sensor 85 that faces the permanent magnet 81 to vary, and variation in position of the permanent magnet 82 in accordance with the spherical swinging operation of the first lens frame 30 causes the output of the Hall sensor 86 that faces the permanent magnet 82 to vary. The position of the first lens frame 30 during the spherical swinging operation thereof can be detected from the output variations of the two Hall sensors 85 and 86.

If the imaging unit 10, which has the above described structure, is pointed at an object located in front of the imaging unit 10, light reflected by the object (light emanating from the photographic object) enters the first prism L11 through the incident surface L11-a, after passing through the first lens element L1, and is reflected at a substantially right angle by the reflection surface L11-c of the first prism L11 and travels toward the exit surface L11-b. Subsequently, the reflected light that emerges from the exit surface L11-b of the first prism L11 enters the second prism L12 from the incident surface L12-a after passing through the second lens element L2, the second lens group G2, the third lens group G3 and the fourth lens group G4, and is reflected at a substantially right angle by the reflection surface L12-c of the second prism L12 and travels toward the exit surface L12-b. Subsequently, the reflected light emerges from the exit surface L12-b and is captured (received) by the imaging surface of the image sensor 14. A zooming operation (power-varying operation) and a focusing operation of the imaging optical system of the imaging unit 10 are performed by moving the second lens group G2 and/or the third lens group G3 along the second optical axis O2 using the two lens drive motors M.

In the imaging unit 10, an image-stabilizing (image shake correction/shake reduction) operation is performed using the first lens element L1 of the first lens group G1, which is positioned in front of the first prism L11. As described above, the anti-shake system drives the first lens frame 30 relative to the sensor holder 31 and the cover member 32 that are fixed with respect to the housing 20. An advantage of selecting the first lens element L1 as an image-stabilizing (anti-shake) optical element is that the imaging unit 10 can be constructed to be slim in the forward/rearward direction, even though the imaging unit 10 is equipped with an anti-shake system. For instance, unlike the present embodiment of the imaging unit 10, in the case of an anti-shake system which moves a second lens group (corresponding to the second lens group G2) or a third lens group (corresponding to the third lens group G3) in a direction orthogonal to the second optical axis O2, securement of the space for movement of the lens frame (not shown) for the second lens group or the third lens group and the arrangement of the driver for this lens frame would cause an increase in the space, in the forward/rearward direction, that is required in the housing 20, thus causing an increase of the thickness of the imaging unit 10.

Additionally, according to the structure of the present embodiment of the imaging unit 10, only the first lens element L1 is driven when image-stabilizing control is performed rather than the entire first lens group G1, and accordingly, there is the advantage of the moving parts being compact, so that the driving load can accordingly be small. In typical anti-shake systems, an entire lens group is usually driven to cancel out image shake. Whereas, in the first lens group G1 of the present embodiment of the imaging unit 10, the distance between the first lens element L1 and the second lens element L2 is great because the first prism L11, which serves merely as a reflector element which reflects the incident light rays, is disposed between the first lens element L1 and the second lens element L2, each of which has a refractive power; therefore, deterioration due to aberrations is small even though the first lens element L1 is solely driven to perform an image-stabilizing control. Accordingly, as an imaging optical system, aberrations are controlled by the entire first lens group G1 (from the first lens element L1 to the second lens element L2); however, regarding the anti-shake system, only the first lens element L1 serves as an image-stabilizing (anti-shake) optical element based on the findings that satisfactory optical performance can be achieved even if the first lens element L1 and the second lens element L2, which are widely spaced from each other in an optical axis direction with the first prism L11 positioned therebetween, are treated as substantially different lens groups.

The spherical swinging operation, which is performed when the first lens element L1 is driven to perform an image-stabilizing operation, allows the first lens element L1 to move widely within a small space (when the imaging unit 10 is viewed from the front along the first optical axis O1) compared with the case where the first lens element L1 moves linearly along a plane orthogonal to the first optical axis O1. Accordingly, the image-stabilizing performance can be improved by increasing the maximum vibration angle that an image-stabilizing operation can accommodate while making the imaging unit 10 compact, not only with respect to the forward/rearward direction but also with respect to the upward/downward direction and the leftward/rightward direction (when the imaging unit 10 is viewed from the front).

Specifically, in the imaging unit 10, with attention focused on the fact that the imaging unit 10 is a bending optical system in which the first prism L11 is positioned behind the first lens element L1, the position of the spherical-swinging center A1, about which the first lens frame 30 is driven to perform the spherical swinging operation, is set at a position behind the reflection surface L11-c of the first prism L11. With this structure, the space at the rear of the first prism L11 can be effectively utilized as the installation space for the support mechanism for the first lens frame 30, and the spherical swinging operation is achieved via a structure that is superior in space utilization. More specifically, portions such as the pivot projection 44 (the pivot arm 41a), the pivot recess 65 (the sensor holder 31), the biasing arm 36, the coil spring 37, the guide portion 45 and the rotation prevention projection 66 (the sensor holder 31), which are associated with supporting of the first lens frame 30, are integrated and housed at a position behind the reflection surface L11-c of the first prism L11. This position behind the reflection surface L11-c is located outside the optical path of the imaging optical system of the imaging unit 10, so that no optically adverse influence occurs even if the support structure for the first lens frame 30 is installed at this position.

In addition, the permanent magnets 81 and 82, the coils 83 and 84 and the Hall sensors 85 and 86, which are associated with image-stabilizing driving and control for the first lens element L1, are arranged in the left section out of the two (left and right) sections on the opposite sides of the second reference plane P2, i.e., in a section on the opposite side of the second reference plane P2 from the side on which the second optical axis O2 extends in a traveling direction of the light rays deflected by the first prism L11. Furthermore, none of the optical elements of the imaging optical system which are positioned optically behind the first prism L11 are arranged in a section on the left side of the second reference plane P2 (i.e., none of the optical elements of the imaging optical system from the second lens element L2 rightward with respect to FIG. 32 are arranged in this left section), and accordingly, the arrangement of the permanent magnets 81 and 82, the coils 83 and 84 and the Hall sensors 85 and 86 in the present embodiment of the imaging unit 10 is not easily subjected to space restrictions, thus being suitable for the permanent magnets 81 and 82, the coils 83 and 84 and the Hall sensors 85 and 86.

Additionally, metal parts such as the motors M, which constitute members of the drive mechanism for moving the second lens group G2 and the third lens group G3 along the second optical axis O2, are provided around an optical path extending from the first prism L11 (in a section on the right side of the second reference plane P2). If these metal parts are made of a magnetic material and are positioned near the electromagnetic actuator, there is a possibility of such metal parts exerting an adverse influence on the image-stabilizing driving operation of the electromagnetic actuator. Whereas, in the imaging unit 10, the permanent magnets 81 and 82 and the coils 83 and 84 are arranged in a section on the left side of the second reference plane P2; therefore, the support and drive mechanism for the second lens group G2 and the third lens group G3 do not easily adversely influence the driving of the electromagnetic actuator even if containing magnetic metals.

As described above, in the imaging unit 10, the first lens frame 30 that supports the first lens element L1 is supported by the sensor holder 31, which supports the Hall sensors 85 and 86, to be capable of performing the spherical swinging operation. The sensor holder 31 also has the capability of preventing the first lens frame 30 from rotating about the optical axis of the first lens element L1 by the engagement between the rotation prevention projection 66 and the guide portion 45. Additionally, the imaging unit 10 is structured to enable the sensor holder 31 to be adjusted in position relative to the housing 20 that supports the optical elements other than the first optical element L1. It is possible to set the spherical-swinging center A1 at an optically optimum position by adjusting the position of the sensor holder 31 relative to the housing 20. Accordingly, the sensor holder 31 is multi-functional, having the following capabilities: the capability of supporting the Hall sensors 85 and 86, the capability of supporting the first lens frame 30 in a manner to allow the first lens frame 30 to perform the spherical swinging operation, the capability of preventing the first lens frame 30 from rotating, and the capability of making adjustments to the position of the spherical-swinging center A1.

According to this structure, optical adjustments for the first lens element L1 can be made without deteriorating the positional accuracy. Specifically, when an optical adjustment is made to the first lens element L1, the sensor holder 31 that has the pivot recess 65 is moved relative to the housing 20. A movement of the sensor holder 31 relative to the housing 20 causes the rotation prevention projection 66, which prevents the first lens frame 30 from rotating, and the Hall sensors 85 and 86, which are mounted on the pair of sensor support projections 61 and 62, to move with the pivot recess 65. Since the rotation prevention projection 66 moves together with the pivot recess 65, the relative position between the rotation preventer (the rotation prevention projection 66 and the guide portion 45) and the spherical-swinging center A1 of the first lens element L1 remains unchanged. If the relative positional relationship between the spherical-swinging center A1 and the rotation preventer varies, there is a possibility of an adverse influence being exerted on the accuracy of the support of the first lens frame 30 depending on the direction in which the relative position relationship varies, whereas there is no possibility of such an adverse influence being exerted on the accuracy for the support of the first lens frame 30 in the present embodiment of the imaging unit 10. In addition, since the Hall sensors 85 and 86 move together with the pivot recess 65, the relative position between the pair of permanent magnets 81 and 82, which are supported on the first lens frame 30, and the Hall sensors 85 and 86, which are supported on the sensor holder 31, remains unchanged. Since the Hall sensors 85 and 86 operate to detect variations of the positions of the permanent magnets 81 and 82 to detect the position of the first lens frame 30 during the spherical swinging operation (image-stabilizing operation) of the first lens frame 30, if the relative position between the pair of permanent magnets 81 and 82 and the pair of Hall sensors 85 and 86 were to vary due to a reason other than an anti-shake driving operation, an adverse influence is exerted on the detection accuracy of the position of the first lens frame 30, whereas there is no possibility of such a problem from occurring in the present embodiment of the imaging unit 10.

Additionally, since the multiple capabilities as described above are given to the sensor holder 31, it is possible to contribute to reductions in size, weight and production cost of the imaging apparatus by reducing the number of components that configure the anti-shake system.

Although the present invention has been described based on the above illustrated embodiment, the present invention is not limited solely thereto; various modifications to the above illustrated embodiment are possible without departing from the scope of the invention. For instance, the structure of the position adjuster for adjusting the position of the sensor holder 31 relative to the housing 20 is not limited to that of the above illustrated position adjuster. Specifically, although the two extended protrusions 26 that are provided on the housing 20 are inserted into the two loose-engaging holes 64 of the sensor holder 31 in the above illustrated embodiment, the imaging apparatus can be provided with one or more than two position adjusters, each including a protrusion and a hole respectively corresponding to each extended protrusion 26 and the associated loose-engaging hole 64. In addition, the positions of the extended protrusions 26 and the loose-engaging holes 64 can be reversed; i.e., an embodiment in which holes corresponding to the loose-engaging holes 64 are formed in the housing 20 and protrusions corresponding to the two extended protrusions 26 are formed on the sensor holder 31 is also possible. Additionally, although each extended protrusion 26 is a cylindrical protrusion while each loose-engaging hole 64 is a circular hole in the above illustrated embodiment, an embodiment in which each extended protrusion 26 and each loose-engaging hole 64 are different in shape from those of the above illustrated embodiment is also possible.

In the above illustrated embodiment, a biasing force for pressing the sensor holder 31 against the housing 20 is produced by resiliently deforming the plurality of support projections 63b, which are provided on the sensor holder 31 to project therefrom, by making each set screw 67 (each washer 68) press against the associated four support projections 63b, as described above. This structure is superior in terms of reduction of the number of components because a biasing force can be applied to the sensor holder 31 with no additional members. However, instead of providing the sensor holder 31 with the plurality of support projections 63b to bias the sensor holder 31, it is also possible to bias the sensor holder 31 by a different biaser. For instance, it is also possible to replace each washer 68 with a spring washer or to insert an independent biasing member in between each rear surface 63a of the sensor holder 31 and the associated washer 68.

Although the sensor holder 31 is lastly fixed to the housing 20 with adhesive in the above illustrated embodiment, the manner of fixing the sensor holder 31 to the housing 20 is not limited solely to this particular manner. For instance, it is also possible to fix the sensor holder 31 to the housing 20 simply by making adjustments to the amount of tightening of each set screw 67. This modified embodiment is identical to the above illustrated embodiment in regard to a biasing force for pressing the sensor holder 31 against the housing 20 being created by the resilient deformation of the plurality of support projections 63b caused by making the set screws 67 (the washers 68) press against the support projections 63b, but different from the above illustrated embodiment in regard to the sensor holder 31 being prevented from moving relative to the housing 20 to move into a fixed state upon each set screw reaching the tightening limit thereof, at which the associated washer 68 abuts against the end surface of the associated extended protrusion

26. More specifically, when the position of the sensor holder 31 is adjusted along a plane orthogonal to the first optical axis O1, each set screw 67 is screwed to an intermediate point before the tightening limit (where the associated washer 68 does not yet come in contact with the end surface of the associated extended protrusion 26). In this state, each support projection 63*b* pressed by the associated washer 68 is resiliently deformed, so that the sensor holder 31 is held with stability, which allows the sensor holder 31 to be positionally adjusted with high precision. After the position of the sensor holder 31 is adjusted and fixed, each set screw 67 is screwed down to the tightening limit thereof, at which the associated washer 68 abuts against the end surface of the associated extended protrusion 26. Thereupon, each support projection 63*b* is almost totally crushed, thereby the pair of mounting portions 63 of the sensor holder 31 being fixedly held between the associated support seat 25 and the associated washer 68. In short, upon each set screw 67 being screwed down to the tightening limit thereof, the sensor holder 31 enters a fixed state where the fastening force of each set screw 67 prevents the sensor holder 31 from being adjusted in position relative to the housing 20.

In addition, as the structure which supports the first lens frame 30 in a manner to allow the first lens frame 30 to perform the spherical swing operation, adopting a different structure from that in the above illustrated embodiment is optional. For instance, the positions of the pivot projection 44 and the pivot recess 65 can be reversed; i.e., it is also possible to provide the sensor holder 31 with a projection corresponding to the pivot projection 44 and provide the first lens frame 30 with a recess corresponding to the pivot recess 65. Additionally, the first lens frame 30 can be made to perform the spherical swinging operation even with a structure in which a projection corresponding to the pivot projection 44 is made to contact a flat surface orthogonal to the first optical axis O1, rather than the base of a recess as with the pivot recess 65. In this case also, it is optional whether the first lens frame 30 or the sensor holder 31 is provided with either of such a projection and a flat surface. Additionally, instead of adopting a structure which makes the first lens frame 30 and the sensor holder 31 come in direct contact with each other, like the above illustrated structure using the pivot projection 44 and the pivot recess 65, it is possible to make the first lens frame 30 to perform the spherical swinging operation even with a structure in which an intermediate member is disposed between the first lens frame 30 and the sensor holder 31 and in which the first lens frame 30 and the sensor holder 31 are connected via the intermediate member to allow the first lens frame 30 to spherically swing about two axes orthogonal to each other (e.g., two axes extending along the first reference plane P1 and the second reference plane P2, respectively).

Adopting a different structure from the above illustrated rotation prevention structure, which prevents the first lens frame 30 from rotating relative to the sensor holder 31, is also optional. For instance, contrary to the relationship between the guide portion 45 (the facing surfaces 45*a*) and the rotation prevention projection 66, it is also possible to prevent the first lens frame 30 from rotating relative to the sensor holder 31 by providing the sensor holder 31 with a hole or groove that is elongated in a radial direction of the first optical axis O1 and by providing the first lens frame 30 with a projection which is fitted into the elongated hole or groove. In this alternative configuration, it is advisable that the aforementioned projection provided on the first lens frame 30 be formed into a shape that is capable of both sliding and tilting with respect to the elongated hole or groove. Specifically, it is desirable for the aforementioned projection provided on the first lens frame 30 to be formed into a rod-like body having a cylindrical outer peripheral surface like the rotation prevention projection 66 that is provided in the above described embodiment or a sphere-like body having a spherical outer peripheral surface. Additionally, the sensor holder 31 that is provided in the above illustrated embodiment is provided with the rotation prevention projection 66 that is formed to project leftward from the pivot recess 65 (i.e., in the opposite direction of the direction in which the second optical axis O2 extends). This projecting direction (leftward direction) of the rotation prevention projection 66 is selected as a direction in which the rotation prevention projection 66 is not subjected to space restrictions which may be imposed by peripheral structures such as the first prism L11 (the prism holding frame 23*a*), the pair of sensor support projections 61 and 62 and the pair of mounting portions 63; however, depending on spaces obtained in association with the peripheral structures, it is also possible to arrange the rotation preventer (which prevents the first lens frame 30 from rotating about the optical axis of the first lens element L1 while allowing the first lens frame 30 to perform the spherical swinging operation) at a position other than the position on the left side of the pivot recess 65.

Although the imaging optical system of the above described imaging apparatus uses a prism as a reflector element which bends an optical path, the prism can be replaced by a mirror, or the like, as a reflector element. Additionally, the present invention can also be applied to a type of imaging apparatus which has an L-shaped optical path without including a reflector element corresponding to the second prism L12 in the imaging optical system. Alternatively, the present invention can be applied to an imaging apparatus which contains a bending optical system including one or more additional reflector elements in addition to the first prism L11 and the second prism L12. In any case, the bending angle (reflecting angle) of an optical axis by a reflector element of the bending optical system can be any angle other than 90 degrees.

In addition, the front lens element (the first lens element L1) that is positioned on the object side of the reflector element (which corresponds to the first prism L11 in the above illustrated embodiment) to perform an image-stabilizing operation can be a lens group configured of a plurality of lens elements instead of a single lens element like the first lens element L1 provided in the above described embodiment.

The first lens element L1 in the above illustrated embodiment has a D-cut shape that is formed with a portion of the outer edge of the first lens element L1 cut out, which contributes to miniaturization of the first lens-group unit 12 in a direction along the second optical axis O2. However, the front elevational shape of the front lens element in the present invention is not limited to that of a D-cut lens element; the present invention is also applicable to an imaging apparatus which includes a front lens element having a shape (e.g., circular shape) different in front elevational view from a D-cut lens.

The present invention does not limit the driver which makes the first lens frame 30 perform the spherical swing operation; actuators, other than voice coil motors, can also be used so long as satisfying conditions that they are compatible with high-speed anti-shake driving.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An imaging apparatus comprising:
   a front lens group which constitutes part of an imaging optical system of said imaging apparatus and includes a reflector and at least one front lens element, which is positioned on the object side of said reflector, wherein said reflector includes a reflection surface which reflects light rays, incident from the object side, in a different direction;
   a rear lens group which constitutes another part of said imaging optical system and is positioned on the image side of said front lens group;
   a movable member which supports said front lens element;
   a fixed member which supports at least said reflector;
   a support which is fixed to said fixed member and supports said movable member to allow said movable member to spherically swing about a predetermined point, positioned behind said reflection surface with respect to a direction along an optical axis of said front lens element;
   an actuator which applies a driving force to said movable member to spherically swing said movable member about said predetermined point in response to vibrations applied to said imaging optical system; and
   a detector which detects positional variations of said movable member when said movable member spherically swings about said predetermined point,
   wherein said support includes a spherical-swinging operation support which is positioned behind said reflection surface in said direction along said optical axis of said front lens element and supports a supported portion of said movable member to allow said movable member to spherically swing about said predetermined point, said spherical-swinging operation support and said supported portion of said movable member comprise mating non-planar surfaces; a rotation preventer which prevents said movable member from rotating about said optical axis of said front lens element; a detector supporter which supports said detector; and a mounting portion which is integral with said support and is mounted to said fixed member, and
   wherein said imaging apparatus further includes an adjuster which enables an entirety of the support, including said mounting portion to be positionally adjusted relative to said fixed member.

2. The imaging apparatus according to claim 1, wherein said adjuster allows said mounting portion to move relative to said fixed member along a plane that is orthogonal to said optical axis of said front lens element while preventing said mounting portion from moving toward said object side relative to said fixed member in said direction along said optical axis of said front lens element.

3. The imaging apparatus according to claim 2, wherein said adjuster comprises:
   an abutment which is provided on said fixed member, wherein said mounting portion abuts against said abutment from an opposite side of said abutment with respect to said object side in said direction along said optical axis of said front lens element;
   a protrusion which protrudes from said abutment toward said opposite side from said object side; and
   a hole which is provided in said mounting portion of said support and in which said protrusion is loosely engaged,
   wherein said adjuster enables a position of said mounting portion to be adjusted relative to said fixed member, in a direction along said plane that is orthogonal to said optical axis of said front lens element, within a range defined by an adjusting clearance between an inner edge of said hole and an outer periphery of said protrusion.

4. The imaging apparatus according to claim 3, wherein said abutment of said fixed member includes a screw hole which is open toward said side opposite from said object side in said direction along said optical axis of said front lens element,
   wherein said imaging apparatus is provided with a screw including a shaft which is inserted into said hole of said mounting portion to be screw-engaged in said screw hole of said fixed member, and a head fixed to said shaft, and
   wherein screwing said shaft portion in said screw hole causes said mounting portion to be sandwiched between said head and said abutment.

5. The imaging apparatus according to claim 4, wherein said mounting portion comprises a projection which is resiliently deformable and is provided on a surface of said mounting portion which faces said head of said screw, and
   wherein screwing said shaft portion in said screw hole causes said head to press and resiliently deform said projection to thereby create a biasing force which presses said mounting portion against said abutment.

6. The imaging apparatus according to claim 5, wherein a minimum clearance between said abutment and said head in said direction along said optical axis of said front lens element is defined by engagement between said protrusion and said head of said screw, and
   wherein said mounting portion of said support is movable along said plane that is orthogonal to said optical axis of said front lens element with said minimum clearance between said abutment and said head.

7. The imaging apparatus according to claim 5, wherein said projection comprises a plurality of projections which are provided on said surface of said mounting portion at equi-angular intervals about said hole of said mounting portion.

8. The imaging apparatus according to claim 4, wherein said imaging apparatus further comprises a washer which is on said shaft portion of said screw, and
   wherein screwing said shaft portion in said screw hole causes said mounting portion to be sandwiched between said washer and said abutment.

9. The imaging apparatus according to claim 3, wherein said adjuster further comprises a spacer which positioned between said abutment and said mounting portion to adjust a position of said support relative to said fixed member in said direction along said optical axis of said front lens element.

10. The imaging apparatus according to claim 1, wherein said actuator comprises a voice coil motor including a permanent magnet which is supported by said movable member, and a coil which is supported fixedly with respect to said fixed member, and
    wherein said detector includes a magnetic sensor which senses variations in a magnetic field of said permanent magnet to obtain information on a position of said movable member.

11. The imaging apparatus according to claim 1, wherein said spherical-swinging operation support of said includes a recess in which a concave spherical surface is provided, and
wherein said supported portion of said movable member includes a convex spherical surface which is slidably engaged with said concave spherical surface.

12. The imaging apparatus according to claim 1, wherein said rotation preventer of said support comprises a rotation prevention projection which projects in a radial direction of an extension of said optical axis of said front lens element.

13. The imaging apparatus according to claim 1, wherein said reflector comprises one of a prism and a mirror.

14. An imaging apparatus comprising:
a front lens group which constitutes part of an imaging optical system of said imaging apparatus and includes a reflector and at least one front lens element, which is positioned on the object side of said reflector, wherein said reflector includes a reflection surface which reflects light rays, incident from the object side, in a different direction;
a rear lens group which constitutes another part of said imaging optical system and is positioned on the image side of said front lens group;
a movable member which supports said front lens element;
a fixed member which supports at least said reflector;
a support which is fixed to said fixed member and supports said movable member to allow said movable member to spherically swing about a predetermined point, positioned behind said reflection surface with respect to a direction along an optical axis of said front lens element;
an actuator which applies a driving force to said movable member to spherically swing said movable member about said predetermined point in response to vibrations applied to said imaging optical system; and
a detector which detects positional variations of said movable member when said movable member spherically swings about said predetermined point,
wherein said support includes a spherical-swinging operation support which is positioned behind said reflection surface in said direction along said optical axis of said front lens element and supports a supported portion of said movable member to allow said movable member to spherically swing about said predetermined point; a rotation preventer which prevents said movable member from rotating about said optical axis of said front lens element; a detector supporter which supports said detector; and a mounting portion which is mounted to said fixed member, and
wherein said imaging apparatus further includes an adjuster which enables said mounting portion to be positionally adjusted relative to said fixed member, said adjuster allows said mounting portion to move relative to said fixed member along a plane that is orthogonal to said optical axis of said front lens element while preventing said mounting portion from moving toward said object side relative to said fixed member in said direction along said optical axis of said front lens element,
wherein said adjuster further comprises an abutment which is provided on said fixed member, wherein said mounting portion abuts against said abutment from an opposite side of said abutment with respect to said object side in said direction along said optical axis of said front lens element, a protrusion which protrudes from said abutment toward said opposite side from said object side, and a hole which is provided in said mounting portion of said support and in which said protrusion is loosely engaged,
wherein said adjuster enables a position of said mounting portion to be adjusted relative to said fixed member, in a direction along said plane that is orthogonal to said optical axis of said front lens element, within a range defined by an adjusting clearance between an inner edge of said hole and an outer periphery of said protrusion.

15. The imaging apparatus according to claim 14, wherein said abutment of said fixed member includes a screw hole which is open toward said side opposite from said object side in said direction along said optical axis of said front lens element,
wherein said imaging apparatus is provided with a screw including a shaft which is insertable into said hole of said mounting portion to be screw-engaged in said screw hole of said fixed member, and a head fixed to said shaft, and
wherein screwing said shaft portion in said screw hole causes said mounting portion to be sandwiched between said head and said abutment.

16. The imaging apparatus according to claim 15, wherein said mounting portion comprises a projection which is resiliently deformable and is provided on a surface of said mounting portion which faces said head of said screw, and
wherein screwing said shaft portion in said screw hole causes said head to press and resiliently deform said projection to thereby create a biasing force which presses said mounting portion against said abutment.

17. The imaging apparatus according to claim 16, wherein said projection comprises a plurality of projections which are provided on said surface of said mounting portion at equi-angular intervals about said hole of said mounting portion.

18. The imaging apparatus according to claim 15, wherein a minimum clearance between said abutment and said head in said direction along said optical axis of said front lens element is defined by engagement between said protrusion and said head of said screw, and
wherein said mounting portion of said support is movable along said plane that is orthogonal to said optical axis of said front lens element with said minimum clearance between said abutment and said head.

19. The imaging apparatus according to claim 18, wherein said adjuster further comprises a spacer which positioned between said abutment and said mounting portion to adjust a position of said support relative to said fixed member in said direction along said optical axis of said front lens element.

20. The imaging apparatus according to claim 15, wherein said imaging apparatus further comprises a washer which is on said shaft portion of said screw, and
wherein screwing said shaft portion in said screw hole causes said mounting portion to be sandwiched between said washer and said abutment.

* * * * *